(12) United States Patent
Tabata et al.

(10) Patent No.: US 7,935,021 B2
(45) Date of Patent: May 3, 2011

(54) CONTROLLER APPARATUS FOR VEHICULAR DEVICE SYSTEM

(75) Inventors: Atsushi Tabata, Okazaki (JP); Yutaka Taga, Aichi-gun (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1001 days.

(21) Appl. No.: 11/664,221

(22) PCT Filed: Oct. 27, 2005

(86) PCT No.: PCT/JP2005/020169
§ 371 (c)(1),
(2), (4) Date: Jun. 5, 2007

(87) PCT Pub. No.: WO2006/046770
PCT Pub. Date: May 4, 2006

(65) Prior Publication Data
US 2008/0076623 A1    Mar. 27, 2008

(30) Foreign Application Priority Data

Oct. 27, 2004  (JP) ................................. 2004-313168
Feb. 4, 2005   (JP) ................................. 2005-029799
Jun. 24, 2005  (JP) ................................. 2005-185792

(51) Int. Cl.
*B60W 10/02*   (2006.01)
*B60W 10/06*   (2006.01)
*F16H 59/74*   (2006.01)

(52) U.S. Cl. ............................. 477/5; 477/99; 477/107

(58) Field of Classification Search ................ 477/4, 19, 477/20
See application file for complete search history.

(56) References Cited

U.S. PATENT DOCUMENTS

| 6,247,437 B1 * | 6/2001 | Yamaguchi et al. ........ 123/179.3 |
| 6,941,830 B2 * | 9/2005 | Ibamoto et al. ................. 74/339 |
| 7,223,200 B2 | 5/2007 | Kojima et al. |
| 2002/0171383 A1 * | 11/2002 | Hisada et al. ................. 318/432 |
| 2003/0075368 A1 * | 4/2003 | Takaoka et al. .............. 180/65.2 |
| 2004/0045751 A1 * | 3/2004 | Aoki et al. .................... 180/65.2 |
| 2004/0153234 A1 | 8/2004 | Mogi et al. |
| 2004/0259680 A1 * | 12/2004 | Ozeki et al. ....................... 477/3 |

FOREIGN PATENT DOCUMENTS

| CN | 1413855 A | 4/2003 |
| DE | 199 51 415 A1 | 5/2000 |
| DE | 103 60 477 A1 | 7/2004 |
| EP | 1 316 458 A1 | 6/2003 |
| JP | 01-240328 A | 9/1989 |
| JP | 01-285427 A | 11/1989 |
| JP | 04-050440 A | 2/1992 |
| JP | 05-215216 A | 8/1993 |

(Continued)

Primary Examiner — Edwin A. Young
(74) Attorney, Agent, or Firm — Kenyon & Kenyon LLP

(57) ABSTRACT

A vehicle-starting-engine-torque restricting device is provided to restrict engine torque upon starting of a vehicle with an engine used as a vehicle drive power source, so that a required output of a first electric motor which generates a reaction force corresponding to the engine torque can be made smaller than when the engine torque is not restricted. Namely, the vehicle-starting-engine-torque restricting device eliminates a need of increasing the maximum output of the first electric motor to generate the reaction force corresponding to the engine torque, making it possible to reduce the required size of the first electric motor.

12 Claims, 22 Drawing Sheets

FOREIGN PATENT DOCUMENTS

| | | |
|---|---|---|
| JP | 08-088905 | 4/1996 |
| JP | 09-280083 A | 10/1997 |
| JP | 10-325344 A | 12/1998 |
| JP | 11-173174 A | 6/1999 |
| JP | 11-217025 | 8/1999 |
| JP | 2000-002327 | 1/2000 |
| JP | 2000-102106 A | 4/2000 |
| JP | 2001-355480 A | 12/2001 |
| JP | 2002-247708 A | 8/2002 |
| JP | 2003-083109 A | 3/2003 |
| JP | 2003-130202 A | 5/2003 |
| JP | 2003-130203 | 5/2003 |
| JP | 2003-301731 A | 10/2003 |
| JP | 2004-028056 A | 1/2004 |
| JP | 2004-092522 A | 3/2004 |
| JP | 2004-254468 A | 9/2004 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROLLER APPARATUS FOR VEHICULAR DEVICE SYSTEM

This is a 371 national phase application of PCT/JP2005/020169 filed 27 Oct. 2005, which claims priority of Japanese Patent Application No. 2004-313168 filed 27 Oct. 2004, No. 2005-029799 filed 4 Feb. 2005, and No. 2005-185792 filed 24 Jun. 2005, the contents of which are incorporated herein by reference.

TECHNICAL FIELD

The present invention relates to a control apparatus for a vehicular drive system, and more particularly to techniques for preventing an increase in the size of a first electric motor in a vehicular drive system including a differential mechanism operable to perform a differential function for distributing an output of an engine to the first electric motor and an output shaft, and a second electric motor provided in a power transmitting path between the differential mechanism and vehicle drive wheels, and to techniques for reducing the sizes of the electric motors and other components of the vehicular drive system.

BACKGROUND ART

There is known a vehicle wherein a clutch provided in a power transmitting path between an engine and drive wheels is released for holding the engine in an operated state during stopping of the vehicle, and is engaged to start the vehicle. Publications identified below show examples of such a vehicle. In a vehicle disclosed in JP-1-285427A, for example, there is provided an actuator for engaging and releasing the clutch. This actuator permits a control of a partially engaged state of the clutch according to an operating amount of an accelerator pedal upon starting of the vehicle, thereby making it possible to suitably start the vehicle while assuring an intricate control of the vehicle running speed.
JP-1-285427 A
JP-5-215216 A
JP-2004-28056 A
JP-1-240328 A
JP-2003-130202 A
JP-2003-301731 A On the other hand, there is also known a vehicle which includes a differential mechanism for distributing an output of an engine to a first electric motor and an output shaft, and a second electric motor provided in a power transmitting path between the output shaft of the differential mechanism and vehicle drive wheels, and which can be suitably started, and wherein the engine can be held in an operated state upon stopping or low-speed running of the vehicle, even in the absence of a mechanism (device) such as the above-described clutch or a fluid-operated power transmitting device in the above-indicated power transmitting path, which mechanism includes input and output rotary members that are rotatable relative to each other. JP-2003-130202A and JP-2003-301731A identified above disclose drive systems for hybrid vehicles as an example of such a vehicle. In these hybrid vehicle drive systems, the differential mechanism is constituted by a planetary gear set operable to perform a differential function permitting the engine to be held in the operated state upon stopping of the vehicle, and is operable as a transmission, for example, as an electrically controlled continuously variable transmission that is controlled by a control device, to mechanically transmit a major portion of a drive force of the engine to the drive wheels, and to electrically transmit the remaining portion of the drive force through an electric path from the first electric motor to the second electric motor, so that the speed ratio of the transmission is electrically variable, whereby the vehicle can be run with improved fuel economy while the engine is kept in an optimum state.

In the hybrid vehicle drive system as disclosed in the above-identified publication JP-2003-130202A wherein the differential mechanism is operated as the transmission the speed ratio of which is electrically changed, however, the first electric motor which generates a reaction torque corresponding to an output torque of the engine (hereinafter referred to "engine torque") is required to be large-sized with an increase in the required output capacity of the engine, since the reaction torque that must be generated by the first electric motor increases with an increase in the engine torque required to assure desired acceleration of the vehicle upon starting of the vehicle.

It is also noted that the differential mechanism provided in the hybrid vehicle drive system of the publication indicated just above is limited in its torque capacity due to its design, so that the differential mechanism is required to be large-sized with an increase in the required output capacity of the engine. This increase of the differential mechanism is not desired for the vehicle. Where the differential mechanism is arranged to distribute the output of the engine to the first electric motor and a power transmitting member, for instance, the differential mechanism is controlled so as to function a transmission the speed ratio of which is electrically controlled, the first electric motor generates a reaction torque corresponding to an output torque of the engine (hereinafter referred to as "engine torque") and is therefore required to be large-sized with an increase in the required output capacity of the engine, since the reaction torque that must be generated by the first electric motor increases with an increase in the engine torque required to assure desired acceleration of the vehicle upon starting of the vehicle.

It is possible to temporarily restrict the engine torque or limit the maximum engine torque to a value not exceeding the maximum reaction torque that can be generated by the first electric motor, for protecting the first electric motor, without increasing the size of the differential mechanism or first electric motor. In this case, the torque to be transmitted to the vehicle drive wheels is reduced, resulting in a possibility of deterioration of the vehicle acceleration or a risk of a failure to obtain the desired vehicle acceleration characteristics.

The vehicular drive system described above is further arranged to drive select one or both of the electric motor and the engine as the vehicle drive power source, depending upon the desired condition of the vehicle such as stopping, low-load running or acceleration of the vehicle, so that the engine is started and stopped, according to the desired condition of the vehicle. For example, the engine is started to select the engine as the vehicle drive power source, if the required vehicle drive torque is increased to obtain the desired vehicle acceleration during running of the vehicle with the electric motor selected as the vehicle drive power source. In this case, the engine torque is not generated for at least a length of time required to start the engine. Namely, there is a possibility that the generation of the engine torque is delayed in the case of starting of the engine, contrary to the case where the engine is held in the operated state. As a result, the transmission of the drive torque to the drive wheels is accordingly delayed, leading to deterioration of the vehicle acceleration or a risk of a failure to obtain the desired vehicle acceleration characteristics.

The present invention was made in view of the background art descried above. It is a first object of this invention to provide a control apparatus for a vehicular drive system including a differential mechanism operable to perform a differential function for distributing an output of an engine to a first electric motor and an output shaft, and an electric motor provided in a power transmitting path between the differential mechanism and a vehicle drive wheel, which control apparatus prevents an increase in the required size of the first electric motor which generates a reaction torque corresponding to a torque of the engine. It is a second object of the invention to provide a control apparatus for a vehicular drive system including a differential mechanism operable to transmit the output of the engine to a power transmitting member, and an electric motor operable to transmit its output to the vehicle drive wheel, which control apparatus reduces deterioration of the vehicle acceleration characteristics.

DISCLOSURE OF THE INVENTION

According to a first embodiment of the present invention, there is provided a control apparatus for (a) a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including an automatic transmission portion which constitutes a part of the power transmitting path and which functions as an automatic transmission, the control apparatus being characterized by comprising (b) vehicle-starting-engine-torque restricting means for restricting an output torque of the engine upon starting of the vehicle with the engine used as a vehicle drive power source.

In the control apparatus constructed as described above for the vehicular drive system including the continuously variable transmission portion operable as the electrically controlled variable transmission and having the differential mechanism having a differential function, and further including the automatic transmission portion functioning as the automatic transmission, the vehicle-starting-engine-torque restricting means is provided to restrict the engine torque upon starting of the vehicle with the engine used as the vehicle drive power source. Accordingly, the required output of the first electric motor which generates a reaction torque corresponding to the engine torque can be made smaller than in the case where the engine torque is not restricted. If the engine torque were not restricted, the maximum output of the first electric motor would be increased. Therefore, the present control apparatus prevents an increase of the required size of the first electric motor.

According to a second embodiment of the invention, the vehicle-starting-engine-torque restricting means restricts the output torque of the engine when a running speed of the vehicle is not higher than a predetermined value. This arrangement permits the continuously-variable transmission portion to be adequately controlled so as to operate as the electrically controlled continuously variable transmission, upon starting of the vehicle with the engine, even if the nominal output of the first electric motor which generates a reaction force corresponding to the engine torque is made smaller. Upon starting of the vehicle with the engine after the vehicle is stopped or at a speed not higher than the predetermined value, the continuously-variable transmission portion must be adequately controlled so as to operate as the electrically controlled continuously variable transmission, in order to permit the engine to be kept in the operated state. In other words, the present arrangement eliminates a need of increasing the maximum output of the first electric motor for the purpose of dealing with the engine torque $T_E$, which would increase to a considerably large value if the engine torque $T_E$ were not restricted.

According to a third embodiment of the invention, the vehicle-starting-engine-torque restricting means restricts the output torque of the engine, so as to prevent an increase of the output torque beyond a maximum reaction torque that can be generated by said first electric motor. Accordingly, the first electric motor can generate the reaction force corresponding to the engine torque. Therefore, the continuously-variable transmission portion can be adequately controlled so as to operate as the electrically controlled continuously variable transmission, even when the accelerator pedal is operated by an amount that would be large enough to otherwise cause the engine torque to exceed the maximum reaction torque of the first electric motor. The present arrangement eliminates a need of increasing the maximum output of the first electric motor for the purpose of dealing with the engine torque, which would increase to a considerably large value if the engine torque were not restricted.

According to a fourth embodiment of the invention, the differential mechanism is provided with a differential-state switching device which is released to place the continuously-variable transmission portion in a continuously-variable shifting state in which the continuously-variable transmission portion is operable as the electrically controlled continuously variable transmission, and engaged to place the continuously-variable transmission portion in a step-variable shifting state in which the continuously-variable transmission portion is not operable as the electrically controlled continuously variable transmission. In this case, the continuously-variable transmission portion of the vehicular drive system is controlled by the differential-state switching device such that the continuously-variable transmission portion is placed in a selected one of the continuously-variable shifting state in which the continuously-variable transmission portion is operable as the electrically controlled continuously variable transmission, and the step-variable shifting state in which the continuously-variable transmission portion is not operable as the electrically controlled continuously variable transmission. Accordingly, the vehicular drive system has both an advantage of an improved fuel economy of a transmission the speed ratio of which is electrically variable, and an advantage of a high power transmitting efficiency of a gear type power transmitting device constructed for mechanical power transmission. The fuel economy is improved when the continuously-variable transmission portion is placed in the continuously-variable shifting state while the vehicle is running at a low or medium speed or output with the engine operating in a normal output state, for example. When the continuously-variable transmission portion is placed in the step-variable shifting state for transmitting the engine output to the drive wheel primarily through a mechanical power transmitting path while the vehicle is running at a high speed, on the other hand, the fuel economy is reduced owing to reduction of a loss of conversion between mechanical and electric energies, which would take place when the vehicular drive system is operated as the transmission the speed ratio of which is electrically variable. The continuously-variable transmission portion is placed in the step-variable shifting state while the vehicle is running at a high output. That is, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the electric energy, whereby the required size of the electric motor and the required size of the vehicular drive system including the electric motor can be further reduced.

In the vehicular drive system wherein the continuously-variable transmission portion is switchable between the continuously-variable and step-variable shifting states, the engine torque is restricted by the vehicle-starting-engine-torque restricting means, upon starting of the vehicle with the engine after the vehicle is stopped or at a speed not higher than the predetermined value, so that it is possible to prevent an increase of the engine output beyond the reaction torque that can be generated by the first electric motor, that is, to prevent the engine torque from exceeding the predetermined upper limit, for permitting the engine to be kept in the operated state. Accordingly, the first electric motor can generate the reaction torque corresponding to the engine torque, and the differential portion is not required to be switched to the step-variable shifting state, so that the differential portion can be adequately controlled so as to operate as the electrically controlled continuously variable transmission. Since the engine torque is restricted by the vehicle-starting-engine-torque restricting means, the differential portion can be adequately controlled so as to operate as the electrically controlled continuously variable transmission, even when the accelerator pedal is operated to start the vehicle, by an amount that would be large enough to otherwise cause the engine torque to exceed the maximum reaction torque of the first electric motor M1, that is, exceed the upper limit. The present arrangement eliminates a need of increasing the maximum output of the first electric motor for the purpose of dealing with the engine torque, which would increase to a considerably large value if the engine torque were not restricted. Thus, the present embodiment is effective to prevent an increase of the required size of the first electric motor.

According to a fifth embodiment of the invention, there is provided a control apparatus for (a) a vehicular drive system including a differential portion having a differential mechanism operable to distribute an output of an engine to a first electric motor and a power transmitting member, and a second electric motor disposed in a power transmitting path between the power transmitting member and a drive wheel of a vehicle, and further including a transmission portion which constitutes a part of the power transmitting path and which functions as a transmission, the control apparatus being characterized by comprising (b) vehicle-starting-engine-torque restricting means for restricting an output torque of the engine upon starting of the vehicle with the engine used as a vehicle drive power source.

In the control apparatus constructed as described above for the vehicular drive system including the differential portion having the differential mechanism having a differential function, and further including the transmission portion, the vehicle-starting-engine-torque restricting means is provided to restrict the engine torque upon starting of the vehicle with the engine used as the vehicle drive power source. Accordingly, the required output of the first electric motor which generates a reaction torque corresponding to the engine torque can be made smaller than in the case where the engine torque is not restricted. If the engine torque were not restricted, the maximum output of the first electric motor would be increased. Therefore, the present control apparatus prevents an increase of the required size of the first electric motor.

According to a sixth embodiment of the invention, the vehicle-starting-engine-torque restricting means restricts the output torque of the engine when a running speed of the vehicle is not higher than a predetermined value. This arrangement permits the differential portion to be adequately controlled so as to operate as an electrically controlled differential device, upon starting of the vehicle with the engine, even if the nominal output of the first electric motor which generates a reaction force corresponding to the engine torque is made smaller. Upon starting of the vehicle with the engine after the vehicle is stopped or at a speed not higher than the predetermined value, the differential portion must be adequately controlled so as to operate as the electrically controlled differential device, in order to permit the engine to be kept in the operated state. In other words, the present arrangement eliminates a need of increasing the maximum output of the first electric motor for the purpose of dealing with the engine torque $T_E$, which would increase to a considerably large value if the engine torque $T_E$ were not restricted.

According to a seventh embodiment of the invention, the vehicle-starting-engine-torque restricting means restricts the output torque of the engine, so as to prevent an increase of the output torque beyond a maximum reaction torque that can be generated by said first electric motor. Accordingly, the first electric motor can generate the reaction force corresponding to the engine torque. Therefore, the differential portion can be adequately controlled so as to operate as the electrically controlled differential device, even when the accelerator pedal is operated by an amount that would be large enough to otherwise cause the engine torque to exceed the maximum reaction torque of the first electric motor. The present arrangement eliminates a need of increasing the maximum output of the first electric motor for the purpose of dealing with the engine torque, which would increase to a considerably large value if the engine torque were not restricted.

According to an eighth embodiment of the invention, the differential mechanism is provided with a differential-state switching device operable to selectively place the differential mechanism in one of a differential state in which the differential mechanism perform a differential function and a locked state in which the differential mechanism does not perform the differential function. In this case, the differential mechanism of the vehicular drive system is controlled by the differential-state switching device such that the differential mechanism is placed in a selected one of the continuously-variable shifting state in which the differential mechanism performs the differential function and the locked state in which the differential mechanism does not perform the differential function. Accordingly, the vehicular drive system has both an advantage of an improved fuel economy of a transmission the speed ratio of which is electrically variable, and an advantage of a high power transmitting efficiency of a gear type power transmitting device constructed for mechanical power transmission. The fuel economy is improved when the differential mechanism is placed in the differential state while the vehicle is running at a low or medium speed or output with the engine operating in a normal output state, for example. When the differential mechanism is placed in the locked state for transmitting the engine output to the drive wheel primarily through a mechanical power transmitting path while the vehicle is running at a high speed, on the other hand, the fuel economy is reduced owing to reduction of a loss of conversion between mechanical and electric energies, which would take place when the vehicular drive system is operated as the transmission the speed ratio of which is electrically variable. The differential mechanism is placed in the locked state while the vehicle is running at a high output. That is, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the electric energy, whereby the required size of the electric motor and the required size of the vehicular drive system including the electric motor can be further reduced.

In the vehicular drive system wherein the differential mechanism is switchable between the differential state and the locked state, the engine torque is restricted by the vehicle-starting-engine-torque restricting means, upon starting of the vehicle with the engine after the vehicle is stopped or at a speed not higher than the predetermined value, so that it is possible to prevent an increase of the engine output beyond the reaction torque that can be generated by the first electric motor, that is, to prevent the engine torque from exceeding the predetermined upper limit, for permitting the engine to be kept in the operated state. Accordingly, the first electric motor can generate the reaction torque corresponding to the engine torque, and the differential mechanism is not required to be switched to the locked state, so that the differential mechanism can be adequately controlled so as to operate as the electrically controlled differential device. Since the engine torque is restricted by the vehicle-starting-engine-torque restricting means, the differential mechanism can be adequately controlled so as to operate as the electrically controlled differential device, even when the accelerator pedal is operated to start the vehicle, by an amount that would be large enough to otherwise cause the engine torque to exceed the maximum reaction torque of the first electric motor M1, that is, exceed the upper limit. The present arrangement eliminates a need of increasing the maximum output of the first electric motor for the purpose of dealing with the engine torque, which would increase to a considerably large value if the engine torque were not restricted. Thus, the present embodiment is effective to prevent an increase of the required size of the first electric motor.

According to a ninth embodiment of the invention, there is provided a control apparatus for a vehicular drive system including an engine, a differential mechanism configured to distribute an output of the engine to a power transmitting member, a power transmitting path for transmitting a vehicle drive force from the power transmitting member to a drive wheel of a vehicle, and an electric motor an output of which is transmittable to the drive wheel, the control apparatus being characterized by comprising (a) engine torque restricting means for restricting the output torque of the engine, on the basis of an upper limit of a torque capacity of the differential mechanism, and (b) assisting torque control means for performing an engine assisting operation by the electric motor during restriction of the output torque of the engine by the engine torque restricting means, to compensate for the restriction of the output torque of the engine. In the present vehicular drive system control apparatus constructed as described above, the assisting torque control means performs the engine assisting operation by the second electric motor during restriction of the engine torque by the engine torque restricting means, to compensate for the restriction of the engine torque. Accordingly, the amount of reduction of the torque to be transmitted to the drive wheel, which is caused by the restriction of the engine torque, is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque, whereby the vehicle operator does not feel uncomfortable with the restriction of the engine torque.

According to a tenth embodiment of the invention, there is provided a control apparatus for a vehicular drive system including an engine, a differential mechanism configured to distribute an output of the engine to a first electric motor and a power transmitting member, a power transmitting path for transmitting a vehicle drive force from the power transmitting member to a drive wheel of a vehicle, and a second electric motor an output of which is transmittable to the drive wheel, the control apparatus being characterized by comprising (a) engine torque restricting means for restricting the output torque of the engine, and (b) assisting torque control means for performing an engine assisting operation by the first electric motor and/or the second electric motor during restriction of the output torque of the engine by the engine torque restricting means, to compensate for the restriction of the output torque of the engine. In the present vehicular drive system control apparatus constructed as described above, the assisting torque control means performs the engine assisting operation by the first electric motor and/or the second electric motor during restriction of the engine torque by the engine torque restricting means, to compensate for the restriction of the engine torque. Accordingly, the amount of reduction of the torque to be transmitted to the drive wheel, which is caused by the restriction of the engine torque, is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque, whereby the vehicle operator does not feel uncomfortable with the restriction of the engine torque.

According to an eleventh embodiment of the invention, the second electric motor is disposed in the power transmitting path. In the present vehicular drive system control apparatus constructed as described above, the engine assisting operation is performed by the second electric motor disposed in the power transmitting path, under the control of the assisting torque control means, so that the amount of reduction of the torque to be transmitted to the drive wheel, which is caused by the restriction of the engine torque, is reduced to reduce the deterioration of the vehicle acceleration.

According to a twelfth embodiment of the invention, the engine torque restricting means restricts the output torque of the engine, on the basis of an upper limit of a torque capacity of the differential mechanism. In the present vehicular drive system control apparatus constructed as described above, the amount of reduction of the torque to be transmitted to the drive wheel, which is caused by the restriction of the engine torque on the basis of the upper limit of the torque capacity of the differential mechanism, is reduced to reduce the deterioration of the vehicle acceleration.

According to a thirteenth embodiment of the invention, the upper limit of the torque capacity of the differential mechanism is an upper limit of a torque capacity of said first electric motor. In the present vehicular drive system control apparatus constructed as described above, the amount of reduction of the torque to be transmitted to the drive wheel, which is caused by the restriction of the engine torque on the basis of the upper limit of the torque capacity of the first electric motor, is reduced to reduce the deterioration of the vehicle acceleration.

According to a fourteenth embodiment of the invention, the upper limit of the torque capacity of the differential mechanism is an upper limit of an electric power transmitting capacity of the differential mechanism. In the present vehicular drive system control apparatus constructed as described above, the amount of reduction of the torque to be transmitted to the drive wheel, which is caused by the restriction of the engine torque on the basis of the upper limit of the electric power transmitting capacity of the differential mechanism, is reduced to reduce the deterioration of the vehicle acceleration.

According to a fifteenth embodiment of the invention, the engine torque restricting means restricts the restricts the output torque of the engine, upon starting of the vehicle with the engine used as a vehicle drive power source. In the present vehicular drive system control apparatus constructed as described above, the amount of reduction of the torque to be transmitted to the drive wheel, which is caused by the restriction of the engine torque upon starting of the vehicle with the engine used as the vehicle drive power source, is reduced to reduce the deterioration of the vehicle acceleration.

According to a sixteenth embodiment of the invention, (a) the differential mechanism includes a coupling device for placing the differential mechanism in a selected one of a differential state in which the differential mechanism performs a differential function, and a locked state in which the differential mechanism does not perform the differential function, and (b) the engine torque restricting means restricts the output torque of the engine upon switching of the differential mechanism to the locked state by the coupling device.

According to a seventeenth embodiment of the invention, the assisting control means does not perform the assisting operation to compensate for the restriction of the output torque of the engine, when a braking operation to brake the vehicle is required. In the present vehicular drive system control apparatus constructed as described above wherein the assisting torque control means does not perform the engine assisting operation to compensate for the restriction of the output torque of the engine, the engine assisting operation is not unnecessarily performed during braking of the engine.

According to an eighteenth embodiment of the invention, there is provided a control apparatus for a vehicular drive system including an engine, a differential mechanism configured to distribute an output of the engine to a power transmitting member, a power transmitting path for transmitting a vehicle drive force from the power transmitting member to a drive wheel of a vehicle, and an electric motor an output of which is transmittable to the drive wheel, the control apparatus being characterized by comprising assisting torque control means for performing an engine assisting operation by the electric motor, to compensate for a delay of generation of an output torque of the engine. In the present vehicular drive system control apparatus constructed as described above wherein the assisting torque control means performs the engine assisting operation by the electric motor to compensate for the delay of generation of the output torque of the engine, a temporary drop of the vehicle drive torque due to the delayed generation of the output torque of the engine is effectively prevented.

According to a nineteenth embodiment of the invention, there is provided a control apparatus for a vehicular drive system including an engine, a differential mechanism configured to distribute an output of the engine to a first electric motor and a power transmitting member, a power transmitting path for transmitting a vehicle drive force from the power transmitting member to a drive wheel of a vehicle, and a second electric motor an output of which is transmittable to the drive wheel, the control apparatus being characterized by comprising assisting torque control means for performing an engine assisting operation by said second electric motor, to compensate for a delay of generation of an output torque of the engine. In the present vehicular drive system control apparatus constructed as described above wherein the assisting torque control means performs the engine assisting operation by the second electric motor to compensate for the delay of generation of the output torque of the engine, a temporary drop of the vehicle drive torque due to the delayed generation of the output torque of the engine is effectively prevented.

According to a twentieth embodiment of the invention, the second electric motor is disposed in the power transmitting path. In the present vehicular drive system control apparatus constructed as described above, the second electric motor disposed in the power transmitting path is operatively connected to the drive wheel.

According to a twenty-first embodiment of the invention, the control apparatus further comprises (a) engine starting control means for starting the engine, and (b) the assisting torque control means performs the engine assisting operation when the generation of the output torque of the engine is delayed upon starting of the engine by the engine starting means. In the present vehicular drive system control apparatus constructed as described above, a temporary drop of the vehicle drive torque due to the delayed generation of the output torque of the engine upon starting of the engine is effectively prevented.

According to a twenty-second embodiment of the invention, (a) the engine is variable in an operating state thereof, and (b) the control apparatus further comprises operating-state changing means for changing the operating state of the engine, and (c) the assisting torque control means performs the engine assisting operation when the generation of the output torque of the engine is delayed upon changing of the operating state of the engine by the operating-state changing means. In the present vehicular drive system control apparatus constructed as described above, a temporary drop of the vehicle drive torque due to the delayed generation of the output torque of the engine upon changing of the operating state of the engine is effectively prevented.

According to a twenty-third embodiment of the invention, (a) the engine is a variable-cylinder engine the number of operable cylinders of which is variable, and (b) the operating-state changing means is configured to change the number of the operable cylinders of the engine, (c) the assisting torque control means performing the engine assisting operation when the generation of the output torque of the engine is delayed upon changing of the number of the operable cylinders of the engine by the operating-state changing means. In the present vehicular drive system control apparatus constructed as described above, a temporary drop of the vehicle drive torque due to the delayed generation of the output torque of the engine upon changing of the number of the operable cylinders of the engine is effectively prevented.

According to a twenty fourth embodiment of the invention, the assisting torque control means does not perform the engine assisting operation to compensate for the delay of generation of the output torque of the engine when an operation to brake the vehicle is required. In the present vehicular drive system control apparatus constructed as described above wherein the assisting torque control means does not perform the engine assisting operation to compensate for the delay of generation of the output torque of the engine, the engine assisting operation is not unnecessarily performed during braking of the engine.

According to the invention as defined in claim 25, the vehicle-starting-engine-torque restricting means does not restrict the output torque of the engine when a running speed of the vehicle is higher than a predetermined value. According to the invention as defined in claim 26, the continuously-variable transmission portion is switched by a differential-mechanism switching device to a step-variable shifting state in which the continuously-variable transmission portion does not perform an electrically controlled continuously-variable shifting operation. According to the invention as defined in claim 27, the vehicle-starting-engine-torque restricting means does not restrict the output torque of the engine when a running speed of the vehicle is higher than a predetermined value. According to the invention as defined in claim 28, the continuously-variable transmission portion is switched by a differential-mechanism switching device to a step-variable shifting state in which the continuously-variable transmission portion does not perform an electrically controlled continuously-variable shifting operation.

In a preferred arrangement of the control apparatus, the continuously-variable transmission portion is placed in the continuously-variable shifting state when the differential mechanism is switched by the differential-state switching device to a differential state in which the differential mechanism performs a differential function, and is placed in the step-variable shifting state when the differential mechanism is switched by the differential-state switching device to a locked state in which the differential mechanism does not perform the differential function. In this case, the continuously-variable transmission portion is switchable between the continuously-variable and step-variable shifting states.

Preferably, the differential mechanism has a first element connected to the engine, a second element connected to the first electric motor, and a third element connected to the power transmitting member, and the differential-state switching device permits the first through third elements to be rotated relative to each other, for placing the differential mechanism in the differential state, and permits the first through third elements to be rotated as a unit or inhibits rotation of the second element, for placing the differential mechanism in the locked state. In this case, the differential mechanism is switchable between the differential and locked states.

Preferably, the differential-state switching device includes a clutch connecting at least two of the first through third elements to each other, for rotating the first through third elements as a unit, and/or a brake connecting the second element to a stationary member, for inhibiting the rotation of the second element. In this case, the differential mechanism can be easily switchable between the differential and locked states.

Preferably, the clutch and the brake are released to place the differential mechanism in the differential state in which the first through third elements are rotatable relative to each other to enable the differential mechanism to operate as an electrically controlled differential device, and the clutch is engaged to enable the differential mechanism to operate as a transmission having a speed ratio of 1, while the brake is engaged to enable the differential mechanism to operate as a speed increasing device having a speed ratio smaller than 1. In this case, the differential mechanism which is switchable between the differential and locked state is operable as a transmission having at least one fixed speed ratio.

Preferably, the differential mechanism is constituted by a planetary gear set including a carrier which functions as the first element, a sun gear which functions as the second element, and a ring gear which functions as the third element. In this case, the required axial dimension of the differential mechanism is reduced, and the differential mechanism constituted by the single planetary gear set is simple in construction.

Preferably, the planetary gear set indicated above is a single-pinion type planetary gear set. In this case, the required axial dimension of the differential mechanism is reduced, and the differential mechanism constituted by the single planetary gear set is simple in construction.

In a further preferred arrangement, the vehicular drive system has an overall speed ratio defined by a speed ratio of the automatic transmission portion and a speed ratio of the continuously-variable transmission portion. In this case, the vehicle drive force is obtained over a wide range of the speed ratio, owing to a change of the speed ratio of the automatic transmission portion, so that the operating efficiency of the continuously-variable transmission portion operating as an electrically controlled continuously variable transmission is further improved.

In another preferred arrangement, the vehicular drive system has an overall speed ratio defined by a speed ratio of the transmission portion and a speed ratio of the differential portion. In this case, the vehicle drive force is obtained over a wide range of the speed ratio, owing to a change of the speed ratio of the transmission portion.

Preferably, the electric motor which is used to perform the engine assisting operation under the control of the assisting torque control means need not be the above-described first or second electric motor, and may be an electric motor provided to drive rear wheels of the vehicle, or an electric motor provided to start the engine.

Preferably, switching control means is provided to switch the differential mechanism to the locked state when a running speed of the vehicle becomes higher than an upper limit predetermined for determining a high-speed running of the vehicle. In this case, during the high-speed running of the vehicle at the running speed higher than the predetermined upper limit, the output of the engine is transmitted to the drive wheel, primarily through a mechanical power transmitting path, so that the fuel economy is improved owing to reduction of a loss of conversion between mechanical and electric energies, which would take place where the differential mechanism operates as a transmission the speed ratio of which is electrically changed.

Preferably, the switching control means indicated above is configured to switch the differential mechanism to the locked state when a required output of the vehicle becomes higher than an upper limit predetermined for determining a high-output running of the vehicle. In this case, during the high-output running of the vehicle wherein the required or actual vehicle drive force or any other drive-force-related value exceeds the predetermined upper limit, the output of the engine is transmitted to the drive wheel, primarily through the mechanical power transmitting path. Therefore, the differential mechanism is operated as a transmission the speed ratio of which is electrically variable, only when the vehicle state is in a low-speed or medium-speed running region, or in a low-output or medium-output running region, Accordingly, the maximum electric energy that must be generated by the electric motor can be reduced, so that the required size of the vehicular drive system including the electric motor can be further reduced. The drive-force-related value indicated above is a value directly or indirectly associated with the vehicle drive force, such as an output torque of the engine, an output torque of the transmission, a drive torque of the drive wheel, and any other torque or rotary drive force transmitted through the power transmitting path, and an angle of opening of a throttle valve corresponding to those torque and rotary drive force values.

Preferably, the switching control means is configured to switch the differential mechanism to the locked state, upon detection of malfunction or functional deterioration of the electric motor and any other electrically controlled components provided to enable the differential mechanism to operate in its differential state as a transmission the speed ratio of which is electrically variable. In this case, the differential mechanism is placed in the locked state upon detection of malfunction or functional deterioration of any one of those components, even while the differential mechanism should be placed in the differential mechanism in the absence of the malfunction or functional deterioration. Accordingly, the vehicle can be run in the locked state of the differential mechanism, as in the differential state, in the presence of the malfunction or functional deterioration.

Preferably, the power transmitting path is partially constituted by a transmission portion, and an overall speed ratio of the vehicular drive system is defined by a speed ratio of the transmission portion and a speed ratio of the differential mechanism. In this case, the vehicle drive force is obtained over a wide range of speed ratio, owing to a change of the speed ratio of the transmission portion, so that the operating efficiency of the differential mechanism operating as an electrically controlled differential device is further improved.

Preferably, the transmission portion is a step-variable automatic transmission. In this case, a continuously variable transmission is constituted by the differential mechanism placed in the differential state and the transmission portion, while a step-variable transmission is constituted by the differential mechanism in the locked state and the transmission portion.

EXPLANATION OF REFERENCE SIGNS

Figures 1, 2:
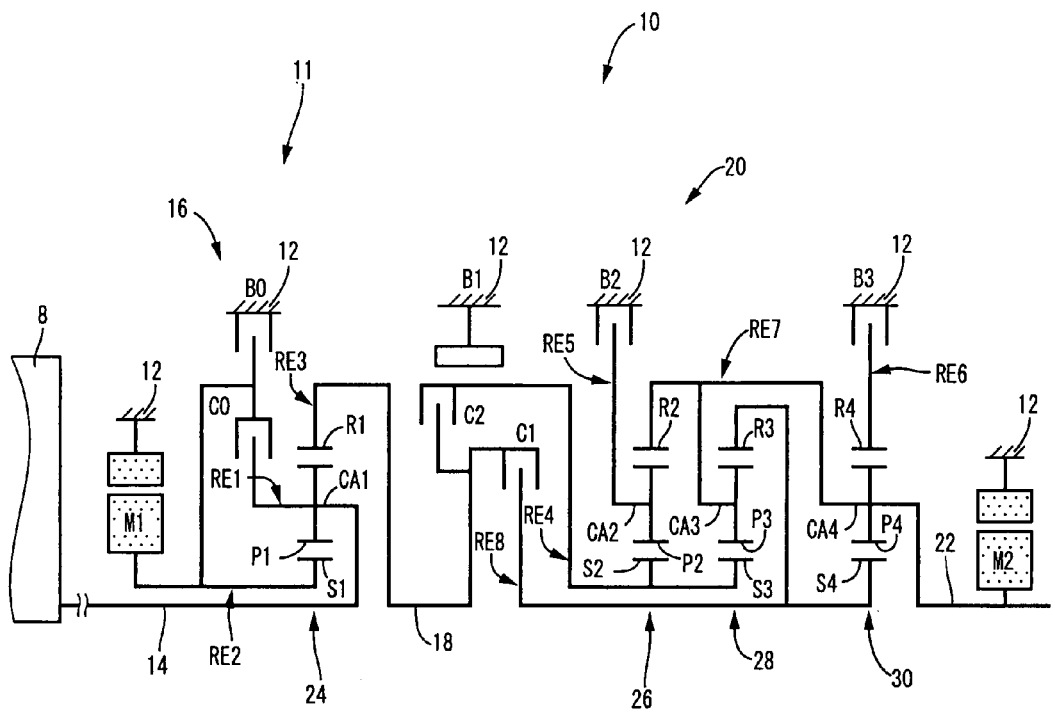
FIG. 1 is a schematic view showing an arrangement of a drive system of a hybrid vehicle according to one embodiment of the present invention.
FIG. 2 is a table indicating shifting actions of the hybrid vehicle drive system of FIG. 1 in a selected one of a continuously-variable shifting state and a step-variable shifting state, in relation to different combinations of operating states of hydraulically operated frictional coupling devices to effect the respective shifting actions.

8: Engine
10, 70: Transmission mechanism (Drive system)
11: Differential portion (Continuously-variable transmission portion)
16: Power distributing mechanism (Differential mechanism)
18: Power transmitting member
20, 72: Automatic transmission portion (Transmission portion)
38: Drive wheels
40: Electronic control device (Control device)
86: Vehicle-starting-engine-torque restricting means
100: Engine-torque restricting means
102: Assisting torque restricting means
110: Operable-cylinder-number control means
112: Engine on-off control means (Engine starting control means)
C0: Switching clutch (Differential-state switching device)
B0: Switching brake (Differential-state switching device)
M1: First electric motor
M2: Second electric motor

BEST MODE FOR CARRYING OUT THE INVENTION

The embodiments of this invention will be described in detail by reference to the drawings.

Embodiment 1

Figure 5:
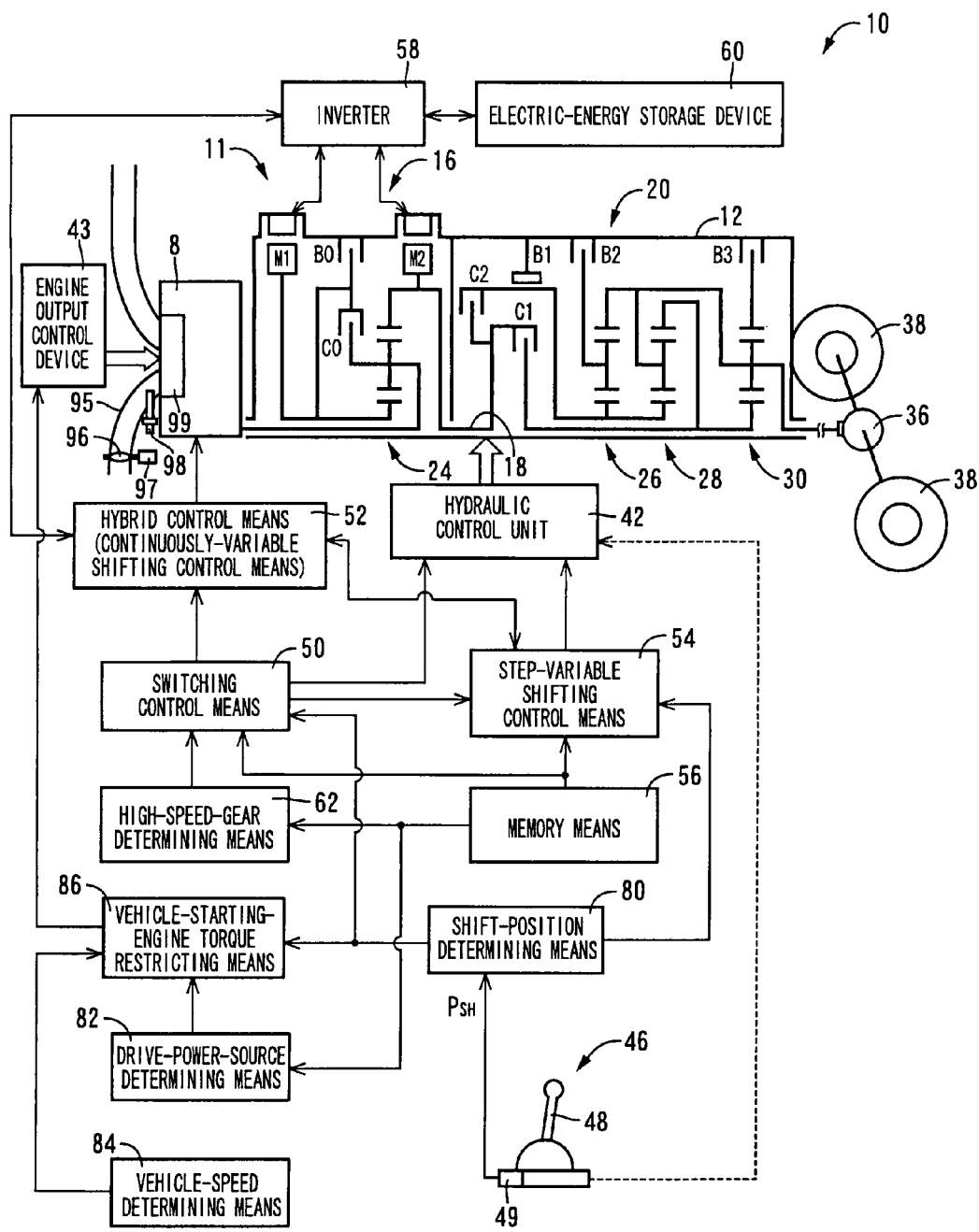
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a transmission portion functioning as a step-variable transmission in the form of an automatic transmission portion 20 disposed in a power transmitting path between the differential portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other, as described above. This direct connection means that the engine 8 and the transmission portion 11 are connected to each other, without a fluid-operated power transmitting device such as a torque converter or a fluid coupling being disposed therebetween, but may be connected to each other through the pulsation absorbing damper described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, and is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0$ min to a maximum value $\gamma 0$ max, that is, in the continuously-variable shifting state in which the power distributing mechanism 16 functions as an electrically controlled continuously variable transmission the speed ratio $\gamma 0$ of which is continuously variable from the minimum value $\gamma 0$ min to the maximum value $\gamma 0$ max.

When the switching clutch C0 or brake B0 is engaged while the power distributing mechanism 16 is placed in the continuously-variable shifting state, the power distributing mechanism 16 is brought into a non-differential state in which the power distributing mechanism 16 does not perform the differential function. Described in detail, when the switching clutch C0 is engaged, the first sun gear S1 and the first carrier CA1 are connected together, so that the power distributing mechanism 16 is placed in a locked state in which the three rotary elements of the first planetary gear set 24 consisting of the first sun gear S1, first carrier CA1 and first ring gear R1 are rotatable as a unit, namely, placed in the non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in the non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7. Thus, the frictional coupling devices in the form of the switching clutch C0 and brake B0 function as a differential-state switching device operable to selectively switch the differential portion 11 (power distributing mechanism 16) between the differential state and the non-differential state, that is, between the continuously-variable shifting state (differential state) in which the differential portion 11 (the power distributing mechanism 16) is operable as an electrically controlled continuously variable transmission the speed ratio of which is continuously variable, and the (fixed-speed-ratio shifting state (non-differential state) in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18)

and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is selectively placed in one of first-gear (first-speed) through fifth-gear (fifth-speed) positions, a reverse gear position (reverse drive position) and a neutral position, by selectively engaging the switching clutch C0, first clutch C1, second clutch C2, switching brake B0, first brake B1, second brake B2 and third brake B3, as indicated in the table of FIG. 2. The first-gear through fifth-gear positions have speed ratios γ(=input shaft speed $N_{IN}$/output shaft speed $N_{OUT}$) which change which change as geometric series. It is noted in particular that the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the fixed-speed ratio shifting state in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected one of the first, second, third and fourth gear positions, namely, the rotating speed of the power transmitting member 18 is continuously changed, so that the speed ratio of the drive system when the automatic transmission portion 20 is placed in the selected gear position is continuously variable over a predetermined range. Accordingly, the total speed ration (overall speed ratio) γT of the transmission mechanism 10 is continuously variable.

Figure 3:
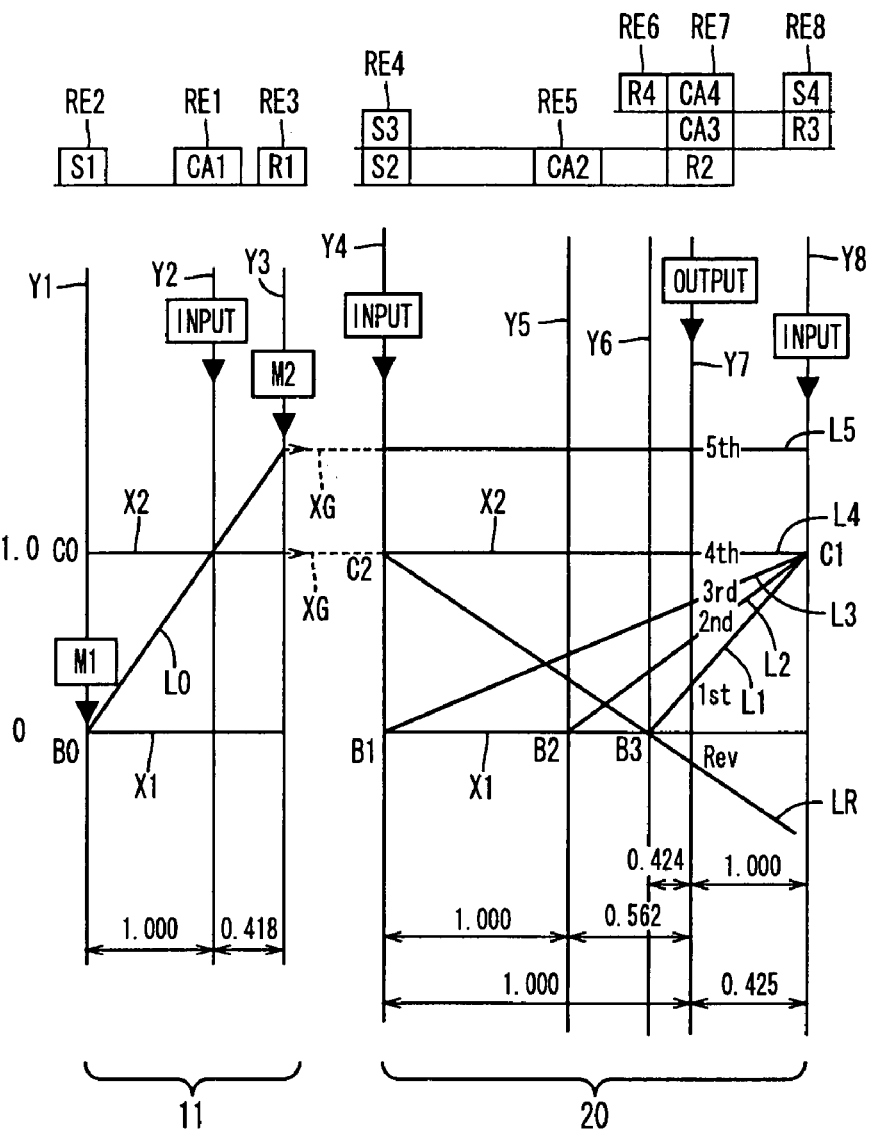
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines, Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the reaction force of the first electric motor M1 generated by its electricity generating operation, so that the rotating speed of the first ring gear R1 represented by a point of intersection between the straight line L0 and the vertical line Y3 is raised or lowered. When the switching clutch C0 is engaged, the first sun gear S1 and the first carrier CA1 are connected to each other, and the power distributing mechanism 16 is placed in the non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the switching brake B0 is engaged, on the other hand, the rotary motion of the first sun gear S1 is stopped, and the power distributing mechanism 16 is placed in the non-differential state in which the power distributing mechanism 16 functions as the speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
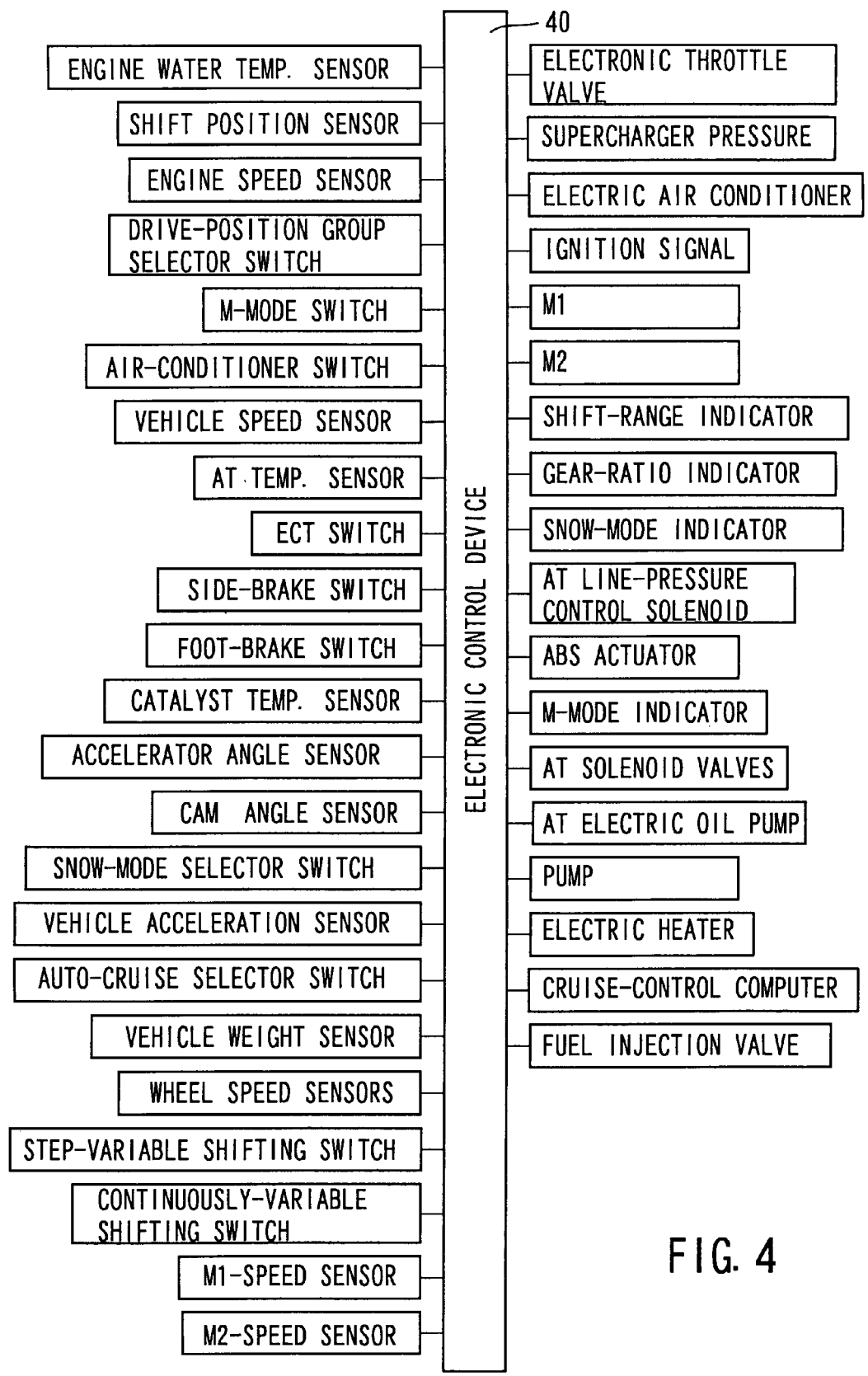
FIG. 4 is a view indicating input and output signals of an electronic control device of the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal 45; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$, of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an air/fuel ratio A/F of the engine 8.

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 46; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40. A step-variable shifting control means 54 shown in FIG. 5 is arranged to determine whether a shifting action of the automatic transmission portion 20 should take place or not, that is, to determine the gear position to which the automatic transmission portion 20 should be shifted or not. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means 56 and which represents shift-up boundary lines indicated by solid lines in FIG. 5 and shift-down boundary lines indicated by one-dot chain lines in FIG. 5. The step-variable shifting control means 54 generates commands to be applied to the hydraulic control unit 42, to selectively engage and release the respectively two hydraulically operated frictional coupling devices, for establishing the determined gear position of the automatic transmission portion 20 according to the table of FIG. 2.

A hybrid control means 52 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 7. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 is arranged to enable the vehicle to be started or driven by only the electric motor, for example, only the second electric motor M2 used as the vehicle drive power source, by utilizing the electric CVT function (differential function) of the differential portion 11, while the engine 8 is held at rest. For reducing a dragging of the engine 8 in its non-operated state to improve the fuel economy upon vehicle starting or during vehicle running with the electric motor, the hybrid control means 52 is arranged to hold the engine speed $N_E$ at zero or substantially zero as needed, by controlling the first electric motor M1 so as to be freely rotated to have a negative speed $N_{M1}$, with the differential portion 11 performing its differential function.

The hybrid control means 52 is further arranged to enable the vehicle to be started with the engine 8 rather than the electric motor used as the vehicle drive power source. The vehicle starting with the engine 8 is effected by raising the speed of the power transmitting member 18 owing to the differential function of the power distributing mechanism 16 while the reaction force of the first electric motor M1 is controlled.

Figure 6:
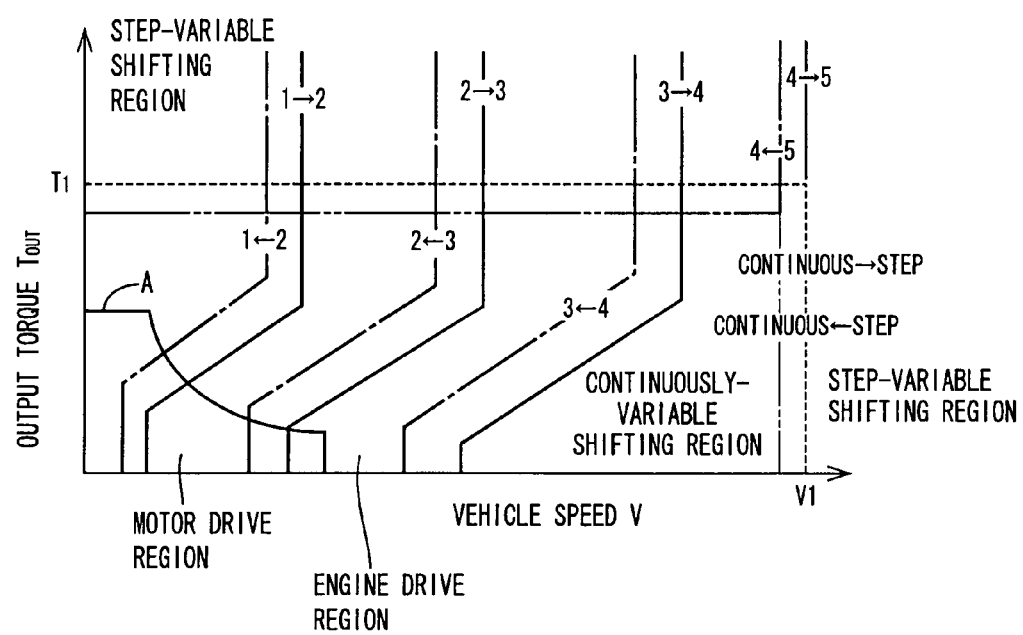
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 6 represents an example of a boundary line defining an engine-drive region and a motor-drive region, for switching the vehicle drive power source for starting and driving the vehicle, between the engine 8 and the electric motor (e.g., second electric motor M2), in other words, between engine drive mode and motor drive mode. A predetermined stored relationship representing the boundary line (solid line A) for switching between the engine drive mode and the motor drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal 45, the vehicle may be started in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to hold the engine speed $N_E$ at a desired speed, irrespective of whether the vehicle is stationary or running, by controlling the first electric motor speed $N_{M1}$ and/or the second electric motor speed $N_{M2}$, owing to the electric CVT function of the differential portion 11. As is apparent from the collinear chart of FIG. 3, the hybrid control means 52 can raise the engine speed $N_E$ by raising the first electric motor speed $N_{M1}$ while the second electric motor speed $N_{M2}$ determined by the vehicle speed V is held substantially constant.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 is arranged to place the first electric motor M1 in the non-load state, for thereby placing the differential portion 11 in a neutral state in which the power transmitting path is electrically cut off.

Referring back to FIG. 5, high-speed-gear determining means 62 is arranged to determine whether the gear position to which the transmission mechanism 10 should be shifted or not on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

Switching control means 50 is arranged to selectively switch the transmission mechanism 10 between the continuously-variable shifting state and the step-variable shifting state, on the basis of the vehicle condition. For example, the switching control means 50 is arranged to determine whether the shifting state of the transmission mechanism 10 should be changed or not, on the basis of the vehicle condition represented by the vehicle speed V and the required output torque $T_{OUT}$ and according to the switching boundary line map (switching control map or relation) stored in the memory means 56 and indicated by broken line and two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted or not, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines. The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1 or not. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1. The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
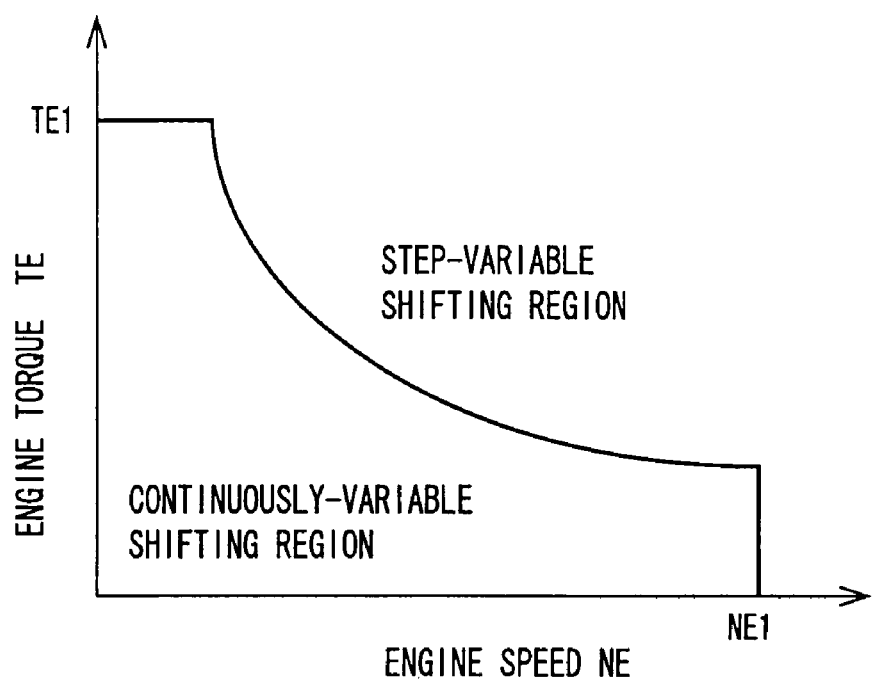
FIG. 7 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.
Figure 8:
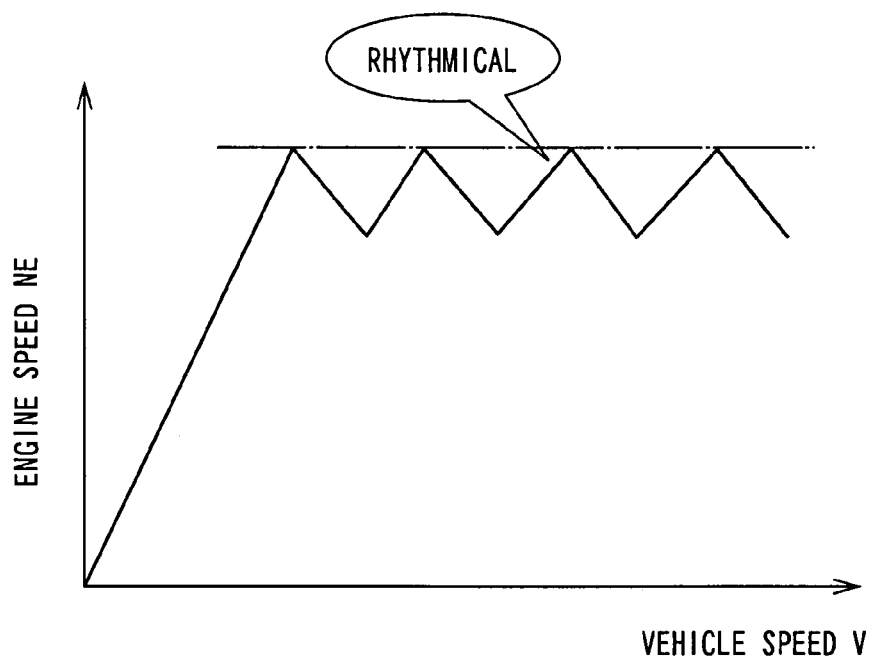
FIG. 8 is a view indicating an example of a change of the engine speed as a result of a shift-up action of the step-variable transmission.

Referring to FIG. 7, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region or not. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 7. In other words, the broken lines in FIG. 6 may be determined on the basis of the relation (map) of FIG. 7, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state. Similarly, the step-variable shifting region defined by the switching boundary line map of FIG. 7 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 7 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can generate the reaction torque corresponding to the engine torque $T_E$ when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, the first electric motor M1 need not generate the reaction torque corresponding to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the required size of the first electric motor M1 can be reduced.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Figure 9:
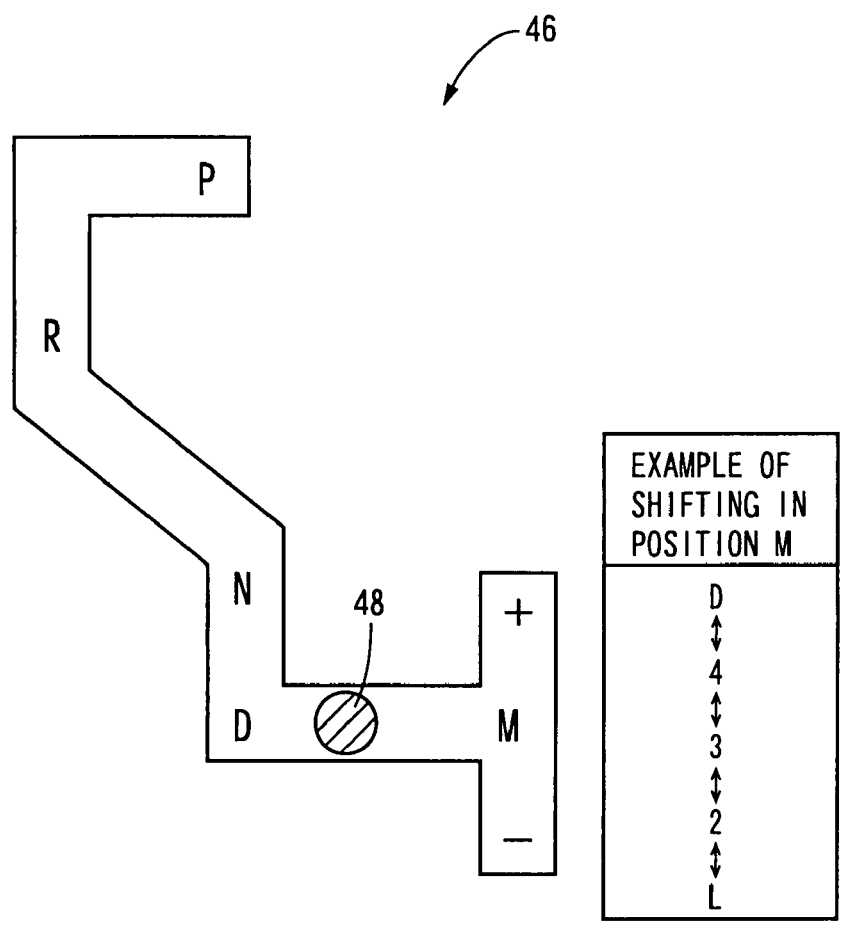
FIG. 9 is a view showing an example of a manually operated shifting device operable to select one of a plurality of shift positions.

FIG. 9 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the first clutch C1 and second clutch C2 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 46 is operated to a selected one of the shift positions, a manual valve incorporated in the hydraulic control unit 42 and operatively connected to the 4 shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the first and second clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 46 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 46 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 46 is operated to the manual forward-drive position M, for manually selecting one of the above-indicated positions "D" through "L". Described in detail, the shift lever 46 is movable from the manual forward-drive position M to a shift-up position "+" and a shift-down position "−", which are spaced from each other in the longitudinal direction of the vehicle. Each time the shift lever 46 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 46 is biased by biasing means such as a spring so that the shift lever 46 is automatically returned from the shift-up position "+" and shift-down position "−" back to the manual forward-drive position M. The shifting device 46 is provided with a shift-position sensor 49 configured to detect the presently selected position of the shift lever 46, so that signals indicative of the presently selected operating position of the shift lever 48 and the number of shifting operations of the shift lever 46 in the manual forward-shifting position M are applied to the electronic control device 40.

When the shift lever 46 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 46 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Referring back to FIG. 5, shift-position determining means 82 is configured to determine the presently selected position of the shift lever 48, that is, the position in which the shift lever 48 is presently placed. This determination is made on the basis of the signal indicative of the presently selected position $P_{SH}$ of the shift lever 48, which signal is generated by the shift position sensor 49. For example, the shift-position determining means 82 is arranged to determine whether the shift lever 48 is placed in the forward-drive position D or reverse-drive position R, on the basis of the signal indicative of the presently selected position $P_{SH}$.

Drive-power-source determining means 82 is configured to determine whether the engine 8 or the second electric motor M2 should be used primarily as the vehicle drive power source by the hybrid control means 52. For instance, the determination by the drive-power-source determining means 82 as to whether the engine 8 should be primarily used or not as the vehicle drive power source by the hybrid control means 52 is made by determining whether the actual vehicle condition represented by the vehicle speed V and the output torque $T_{OUT}$ lies in the engine drive region or not. This determination is made according to the drive-power-source switching map of FIG. 6.

The differential portion 11 provided in the present embodiment is switchable between the continuously-variable shifting state and the step-variable shifting state (fixed-speed-ratio shifting state). In the continuously-variable shifting state of the differential portion 11, the engine speed $N_E$ can be controlled by the electrically controlled continuously variable shifting operation of the differential portion 11, without an influence of the vehicle speed V. For example, the hybrid control means 52 holds the engine 8 in its operated state owing to the electric CVT function of the differential portion 11, even while the vehicle is stationary or running at a low speed. In the continuously-variable shifting state of the differential portion 11, therefore, the hybrid control means 52 permits the engine 8 to be kept in its operated state, assuring starting of the vehicle with the engine 8, even in the absence of a fluid-operated power transmitting device in the power transmitting path, such as a clutch, a torque converter or any other device the input and output rotary members of which are rotatable relative to each other.

In the fixed-speed-ratio shifting state of the differential portion 11, on the other hand, the engine 8 and the drive wheels 38 are connected to each other by a mechanical power transmitting path, so that the engine speed $N_E$ is influenced by the vehicle speed V. While the vehicle is stationary or running at a low speed, therefore, the hybrid control means 52 cannot permit the engine 8 to be kept in the operated state, giving rise to a risk of a failure to start the vehicle with the engine 8.

For the hybrid control means 52 to be able to adequately control the continuously-variable shifting state of the differential portion 11, the first electric motor M1 should generate a reaction torque corresponding to the engine torque $T_E$. In the present embodiment, however, the differential portion 11 is placed in the step-variable shifting state when the engine torque $T_E$ is not smaller than the predetermined upper limit TE1. Accordingly, the first electric motor M1 is not required to generate the reaction torque corresponding to the engine torque not smaller than the upper limit TE1, so that the required size of the first electric motor M1 can be made small-sized. If the required output torque $T_{OUT}$ is equal to or larger than the limit value T1, that is, the upper limit TE1, by a large amount of operation of the accelerator pedal 45 to start the vehicle with the engine, the hybrid control means 52 switches the differential portion 11 to its step-variable shifting state. In this case, there is a possibility that the vehicle can be suitably started with the engine under the control of the hybrid control means 52. In other words, the first electric motor M1 must be large-sized for the first electric motor M1 to be able to generate a reaction torque corresponding to the engine torque $T_E$ not smaller than the upper limit TE1, for the sole purpose of starting the vehicle with the engine upon depression of the accelerator pedal 45 by a large amount.

For preventing an increase of the required size of the first electric motor M1 while permitting adequate starting of the vehicle with the engine under the control of the hybrid control means 52, the engine torque $T_E$ is controlled so as to prevent an increase of the engine torque $T_E$ beyond the upper limit TE1 upon starting of the vehicle with the engine. This control of the engine torque $T_E$ will be described.

Vehicle-speed determining means 84 is configured to determine whether the actual vehicle speed V is higher than a predetermined value V2 or not, in other words, whether the vehicle is stationary or running at a very low speed or not, namely, whether the actual vehicle speed V is not higher than the predetermined value V2, or not. This value V2 corresponds to an engine speed above which the engine can be kept operated by itself, for example, corresponds to an engine idling speed $N_{IDL}$. The vehicle speed V2 is a threshold value used in the step-variable shifting state of the differential portion 11, to determine whether the engine speed $N_E$ influenced by the vehicle speed V is higher than the engine idling speed $N_{IDL}$ or not. This threshold value V2 is predetermined and stored in a memory.

Vehicle-starting-engine-torque restricting means 86 is configured to restrict or limit the engine torque $T_E$, for reducing the output of the first electric motor M1 generating a reaction force corresponding to the engine torque $T_E$, that is, for preventing an increase of the required size of the first electric motor M1. The vehicle-starting-engine-torque restricting means 86 restricts the engine torque $T_E$, when the vehicle is started with the engine 8 used as the vehicle drive power source, namely, when the shift-position determining means 80 determines that the presently selected shift position is the forward-drive position D or the reverse-drive position R, and when the drive-power-source determining means 82 determines that the present vehicle condition is in the engine-drive region.

For instance, the vehicle-starting-engine-torque restricting means 86 is arranged to restrict the engine torque $T_E$, so that the differential portion 11 functions as the electrically controlled continuously variable transmission under the control of the hybrid control means 52, that is, such that the engine torque $T_E$ does not exceed the maximum reaction torque that can be generated by the first electric motor M1. That is, the engine torque $T_E$ is restricted to prevent an increase of the engine torque $T_E$ beyond the predetermined upper limit TE1, for preventing the differential portion 11 from being switched by the switching control means 50 to the step-variable shifting control state due to the increase of the required engine torque $T_E$, namely, for permitting the differential portion 11 to be held in the continuously-variable shifting state by the switching control means 50.

Figure 10:
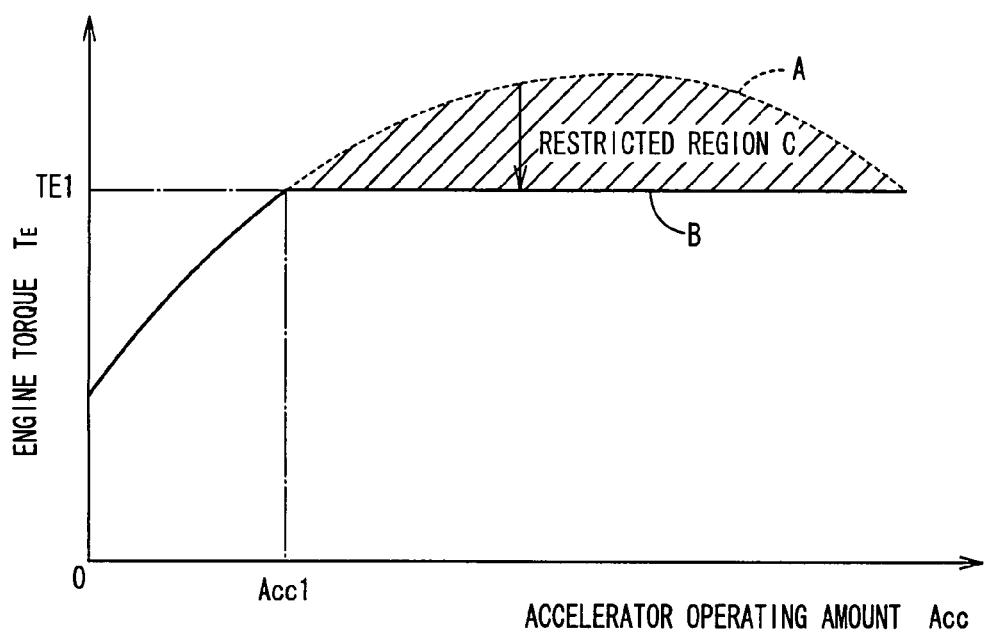
FIG. 10 is a view showing an example of an output characteristic of an engine torque in relation to an operating amount of an accelerator pedal, a hatched area in the view corresponding to a restricted region in which the engine torque is held below a predetermined value to hold a differential portion of the drive system in its continuously-variable shifting state.

Referring to FIG. 10, there is shown an example of an output characteristic of the engine torque $T_E$ in relation to the operating amount $A_{CC}$ of the accelerator pedal 45. As indicated by a hatched area in FIG. 10, the required engine torque $T_E$ exceeds the predetermined upper limit TE1 when the operating amount $A_{CC}$ of the accelerator pedal 45 exceeds a predetermined value $A_{CC1}$. The hatched area corresponds to a restricted region C of the vehicle state in which the actual engine torque $T_E$ is held below the predetermined upper limit TE1 to hold the differential portion 11 in its continuously-variable shifting state. Thus, the vehicle-starting-engine-torque restricting means 86 restricts the engine torque $T_E$, so as to change the output characteristic of the engine torque $T_E$ from that of broken line A to that of solid line B, when the operating amount $A_{CC}$ of the accelerator pedal 45 has exceeded the upper limit $A_{CC1}$, upon starting of the vehicle with the engine 8 used as the vehicle drive power source.

When the actual vehicle speed V is higher than the predetermined value V2, that is, when the vehicle-speed determining means 84 determines that the actual vehicle speed V is higher than the predetermined value V2, no problem arises if the switching control means 50 switches the differential portion 11 to the step-variable shifting state, since the engine 8 can be kept operated by itself even with the engine speed $N_E$ being influenced by the vehicle speed V in the fixed-speed-ratio shifting state of the differential portion 11. Therefore, the vehicle-starting-engine-torque restricting means 86 does not restrict the engine torque $T_E$ when the vehicle speed V is higher than the predetermined value V2.

When the vehicle-speed determining means 84 determines that the actual vehicle speed V is not higher than the predetermined value V2, on the other hand, the vehicle-starting-engine-torque restricting means 86 restricts the engine torque $T_E$, to prevent the differential portion 11 from operating as the electrically controlled continuously variable transmission under the control of the hybrid control means 52, that is, to prevent an increase of the engine torque $T_E$ beyond the maximum reaction torque that can be generated by the first electric motor M1.

Figure 11:
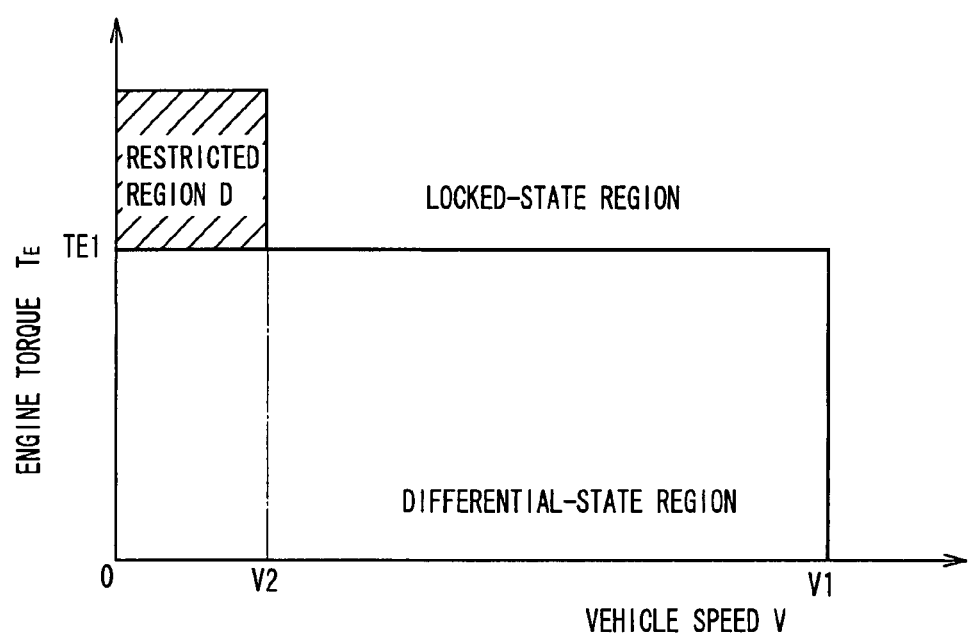
FIG. 11 is a view indicating an example of the continuously-variable shifting region (differential-state region) and the step-variable shifting region (locked-state region) shown in FIGS. 6 and 7, as represented in the two-dimensional coordinate system defined by the control parameters in the form of the vehicle running speed and the engine torque, a hatched area in the view indicating a restricted region in which the engine torque is held below the predetermined value to hold the differential portion in its continuously-variable shifting state.

Referring to FIG. 11, there is indicated an example of the continuously-variable shifting region (differential-state region) and the step-variable shifting region (locked-state region) shown in FIGS. 6 and 7, as represented in the two-dimensional coordinate system defined by the control parameters in the form of the vehicle speed V and the engine torque $T_E$. A hatched area in FIG. 11 corresponds to a restricted region D in which the vehicle speed V is not higher than the predetermined value V2 while the required engine torque $T_E$ is larger than the predetermined upper limit TE1 and in which the actual engine torque $T_E$ is held below the predetermined upper value TE1 to hold the differential portion 11 in its continuously-variable shifting state. Thus, the vehicle-starting-engine-torque restricting means 86 restricts the engine torque $T_E$, so as to prevent its increase into the restricted region D, when the vehicle speed V is not higher than the predetermined value V2 upon starting of the vehicle with the engine 8 used as the vehicle drive power source.

The vehicle-starting-engine-torque restricting means 86 restricts the engine torque $T_E$ to prevent its increase beyond the upper limit TE1, by commanding the engine output control device 43 to effect a selected one or a selected combination of reduction of the angle of opening of the electronic throttle valve 96 irrespective of the operating amount of the accelerator pedal 45; reduction of an amount of fuel supply by the fuel injecting device 98; and retardation of the timing of ignition of the engine 8 by the ignition device 99. The engine output control device 43 is commanded by the vehicle-starting-engine-torque restricting device 86, to control the throttle actuator 97 for controlling the angle of opening of the electronic throttle valve 96, and/or to control the fuel injecting device 98 for controlling the among of fuel injection, and/or to control the ignition device 99 such as an igniter for controlling the ignition timing, so that the engine torque $T_E$ is suitably restricted.

It is noted that when the presently selected position $P_{SH}$ of the shift lever 48 is one of the non-drive positions P and N, the first clutch C1 and the second clutch C2 are both placed in the released state, and the power transmitting path between the differential portion 11 and the automatic transmission 20 is in the power cut-off state, so that the first electric motor M1 is not required to generate a reaction force corresponding to the engine torque $T_E$. In this instant, the vehicle-starting-engine-torque restricting means 86 is not required to restrict the engine torque $T_E$. When the presently selected position $P_{SH}$ of the shift lever 48 is the neutral position N, the first electric motor M1 is placed in a non-load state, and the first electric motor M1 is not required to generate a reaction torque corresponding to the engine torque $T_E$, so that the vehicle-starting-engine-torque restricting means 86 is not required to restrict the engine torque $T_E$.

Figure 12:
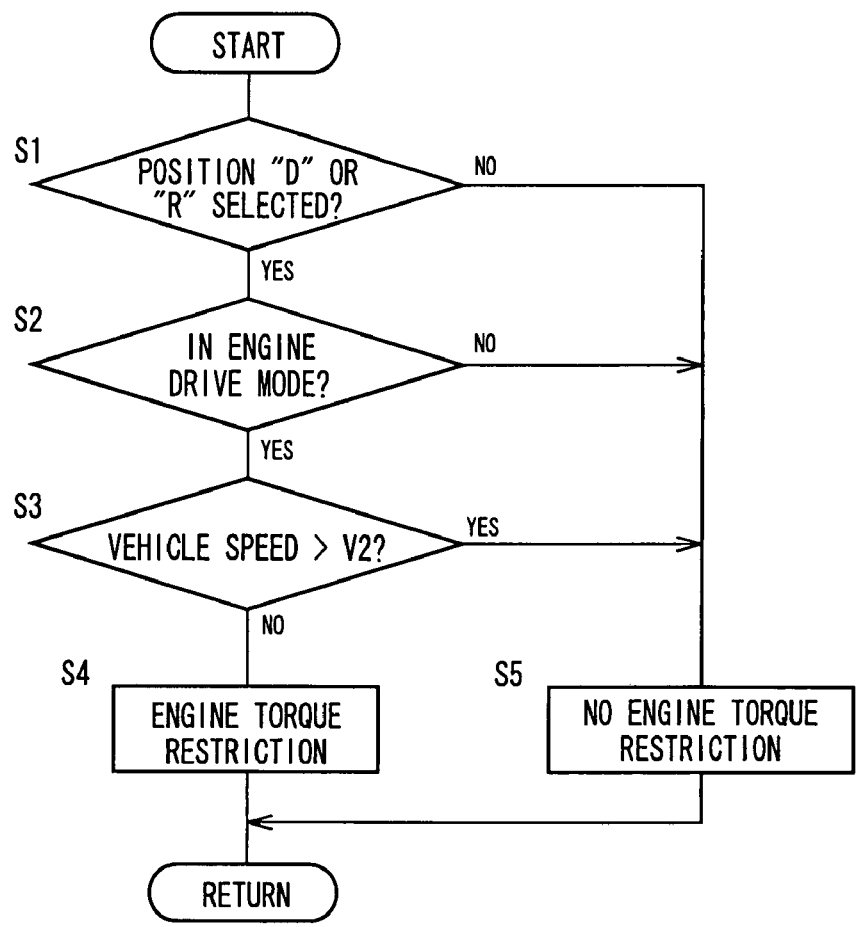
FIG. 12 is a flow chart illustrating a control operation of the electronic control device of FIG. 5 to control the engine torque upon starting of the vehicle.

Referring to the flow chart of FIG. 12, there is illustrated a major portion of a control operation of the electronic control device 40, namely, a control routine to control the engine torque upon starting of the vehicle with the engine. This control routine is repeatedly executed with a very short cycle time of several milliseconds to several tens of milliseconds, for example.

The control routine is initiated with step S1 (hereinafter "step" being omitted) corresponding to the shift-position determining means 80, to determine whether the presently selected position of the shift lever 48 is the drive position D or R. This determination is made on the basis of the output signal of the shift-position sensor 49 indicative of the presently selected position $P_{SH}$ of the shift lever 48.

If an affirmative determination is obtained in S1, the control flow goes to S2 corresponding to the drive-power-source determining means 82, to determine whether the engine 8 is primarily used as the vehicle drive power source under the control of the hybrid control means 52, or not. This determination is made on the basis of the actual vehicle state represented by the vehicle speed V and the output torque $T_{OUT}$ and according to the drive-power-source switching map of FIG. 6, for example.

If an affirmative determination is obtained in S2, the control flow goes to S3 corresponding to the vehicle-speed determining means 84, to determine whether the actual vehicle speed V is higher than the predetermined value V2 or not.

If a negative determination is obtained in S3, the control flow goes to step S4 corresponding to the vehicle-starting-engine-torque restricting means 86, to restrict the engine torque $T_E$, for permitting the differential portion 11 to operate as the electrically controlled continuously variable transmission under the control of the hybrid control means 52, that is, for preventing the engine torque $T_E$ from exceeding the maximum reaction force of the first electric motor M1. For example, the vehicle-starting-engine-torque restricting means 86 restricts the engine torque $T_E$ to prevent its increase beyond the upper limit TE1, by commanding the engine output control device 43 to effect a selected one of, or a selected combination of reduction of the angle of opening of the electronic throttle valve 96 irrespective of the operating amount of the accelerator pedal 45; reduction of an amount of fuel supply by the fuel injecting device 98; and retardation of the timing of ignition of the engine 8 by the ignition device 99.

If a negative determination is obtained in S1 or S2 or if an affirmative determination is obtained in S3, the control flow goes to step S5 also corresponding to the vehicle-starting-engine-torque restricting means 86, in which the restriction of the engine torque $T_E$ is not effected. The restriction of the engine torque $T_E$ is not necessary, not only when the engine torque $T_E$ is not larger than the upper limit TE1, but also when the vehicle speed V is higher than the predetermined value V2 while the engine torque $T_E$ is larger than the upper limit $T_E$.

In the control apparatus according to the present embodiment described above, the vehicle-starting-engine-torque restricting means 86 is provided to restrict the engine torque $T_E$ upon starting of the vehicle with the engine 8 used as a vehicle drive power source. Accordingly, the required output of the first electric motor M1 which generates a reaction torque corresponding to the engine torque $T_E$ can be made smaller than in the case where the engine torque $T_E$ is not restricted. If the engine torque $T_E$ were not restricted, the maximum output of the first electric motor M1 would be increased. Therefore, the present control apparatus prevents an increase of the required size of the first electric motor M1.

The present embodiment is further arranged such that the vehicle-starting-engine-torque restricting means 86 restricts the engine torque $T_E$ when the running speed V of the vehicle is not higher than the predetermined value V2. This arrangement permits the differential portion 11 to be adequately controlled so as to operate as the electrically controlled continuously variable transmission, even if the nominal output of the first electric motor M1 which generates a reaction force corresponding to the engine torque $T_E$ is made smaller. In other words, the present arrangement eliminates a need of increasing the maximum output of the first electric motor M1 for the purpose of dealing with the engine torque $T_E$, which would increase to a considerably large value if the engine torque $T_E$ were not restricted.

The present embodiment is further arranged such that the vehicle-starting-engine-torque restricting means 86 restricts the engine torque $T_E$, so as to prevent an increase of the engine torque $T_E$ beyond a maximum reaction torque that can be generated by the first electric motor M1. Accordingly, the first electric motor M1 can generate the reaction force corresponding to the engine torque $T_E$. Therefore, the differential portion 11 can be adequately controlled so as to operate as the electrically controlled continuously variable transmission, even when the accelerator pedal 45 is operated to start the vehicle, by an amount that would be large enough to otherwise cause the engine torque $T_E$ to exceed the maximum reaction torque of the first electric motor M1. The present arrangement eliminates a need of increasing the maximum output of the first electric motor M1 for the purpose of dealing with the engine torque $T_E$, which would increase to a considerably large value if the engine torque $T_E$ were not restricted.

The present embodiment is further arranged such that the transmission mechanism 10 is provided with the switching clutch C0 and the switching brake B0 operable to switch the differential portion between the continuously-variable shifting state and the step-variable shifting state. Upon starting of the vehicle with the engine after the vehicle is stopped or at a speed not higher than the predetermined value V2, the engine torque $T_E$ is restricted by the vehicle-starting-engine-torque restricting means 86 to prevent an increase of the engine output $T_E$ beyond the reaction torque that can be generated by the first electric motor M1, that is, to prevent the engine torque $T_E$ from exceeding the predetermined upper limit TE1, for permitting the engine 8 to be kept in the operated state. Accordingly, the first electric motor M1 can generate the reaction torque corresponding to the engine torque $T_E$, and the differential portion 11 is not required to be switched to the step-variable shifting state, so that the differential portion 11 can be adequately controlled so as to operate as the electrically controlled continuously variable transmission. Since the engine torque $T_E$ is restricted by the vehicle-starting-engine-torque restricting means 86, the differential portion 11 can be adequately controlled so as to operate as the electrically controlled continuously variable transmission, even when the accelerator pedal 45 is operated to start the vehicle, by an amount that would be large enough to otherwise cause the engine torque $T_E$ to exceed the maximum reaction torque of the first electric motor M1, that is, exceed the upper limit TE1. The present arrangement eliminates a need of increasing the maximum output of the first electric motor M1 for the purpose of dealing with the engine torque $T_E$, which would increase to a considerably large value if the engine torque $T_E$ were not restricted. Thus, the present embodiment is effective to prevent an increase of the required size of the first electric motor M1.

Other embodiments of the present invention will be described. In the following descriptions, the same reference as used in the preceding embodiment signs will be used to identify the corresponding elements which will not be described.

Embodiment 2

Figures 13, 14:
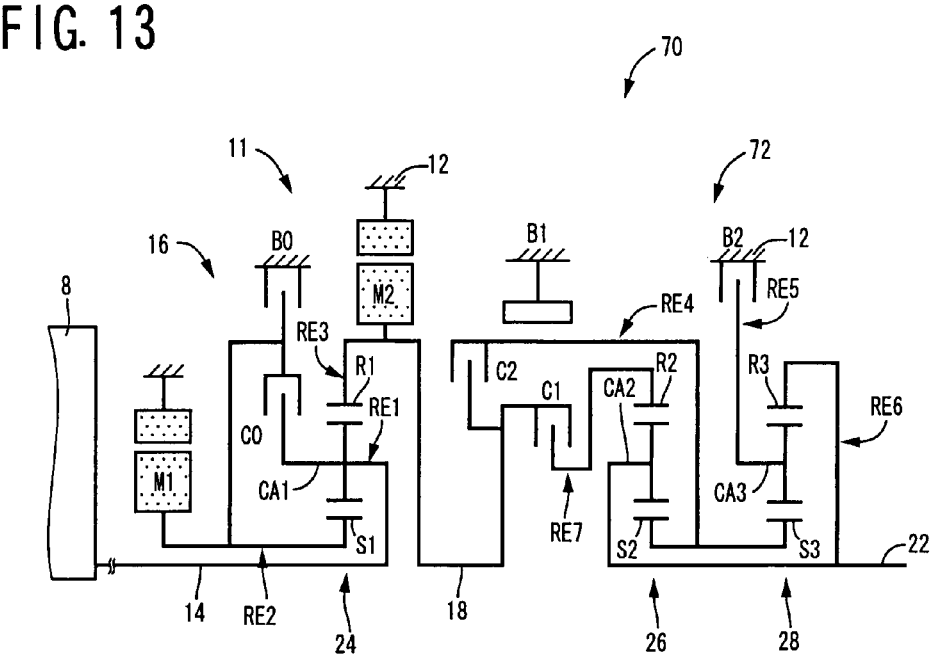
FIG. 13 is a schematic view corresponding to that of FIG. 1, showing an arrangement of a hybrid vehicle drive system according to another embodiment of this invention.
FIG. 14 is a table corresponding to that of FIG. 2, indicating shifting actions of the hybrid vehicle drive system of FIG. 13 in a selected one of the continuously-variable and step-variable shifting states, in relation to different combinations of operating states of hydraulically operated frictional coupling devices to effect the respective shifting actions.
Figure 15:
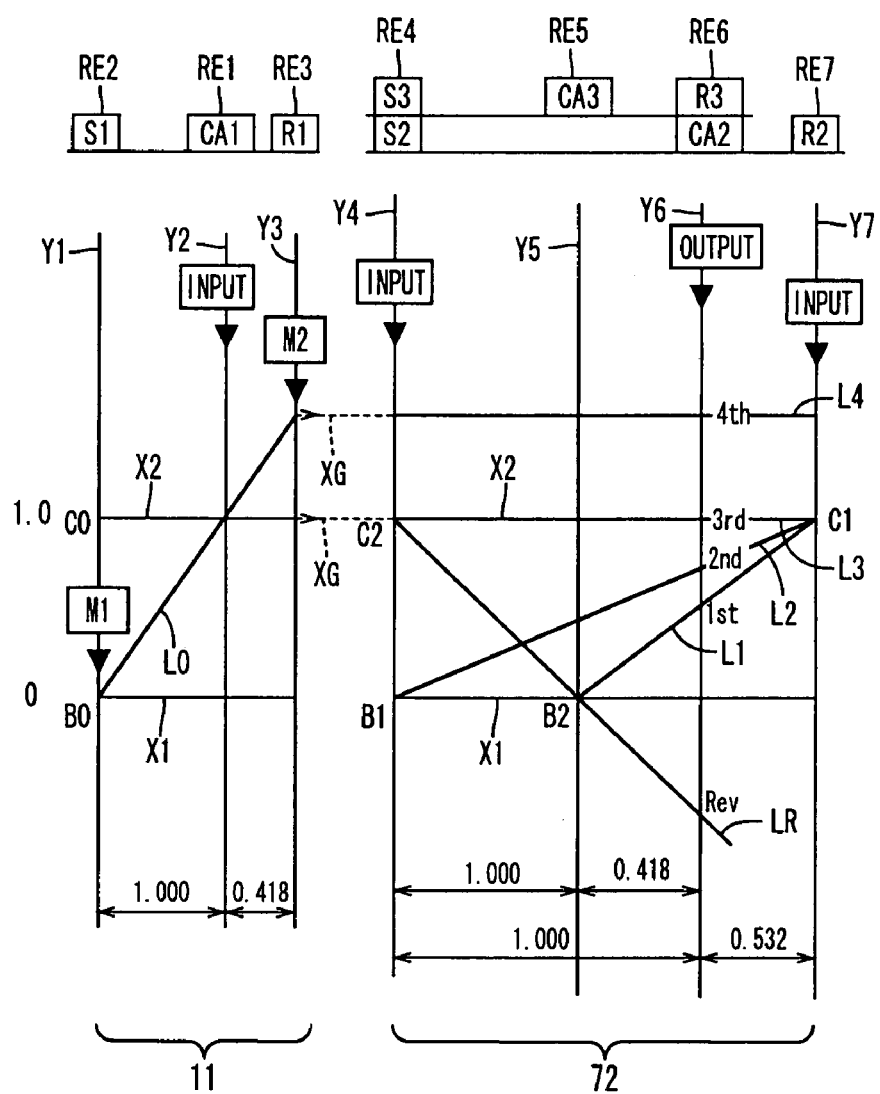
FIG. 15 is a collinear chart corresponding to that of FIG. 3, indicating relative rotating speeds of the rotary elements of the hybrid vehicle drive system of FIG. 13 in the step-variable shifting state, in the different gear positions.

Referring to the schematic view of FIG. 13, there is shown an arrangement of a transmission mechanism 70 in another embodiment of this invention, and FIG. 14 a table indicating a relationship between the gear positions of the transmission mechanism 70 and different combinations of engaged states of the hydraulically operated frictional coupling devices for respectively establishing those gear positions, while FIG. 15 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 14. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 14. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 14, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 15 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 15 indicates the rotating speeds of the individual elements of the power distributing mechanism 16 11 when the switching clutch C0 and brake B0 are both released, and the rotating speeds of those elements when the switching clutch C0 or brake B0 is engaged, as in the preceding embodiment.

In FIG. 15, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 15. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, and the output shaft 22 is provided with the third electric motor M3, so that the present transmission mechanism 70 has advantages similar to those of the first embodiment.

Embodiment 3

Figure 16:
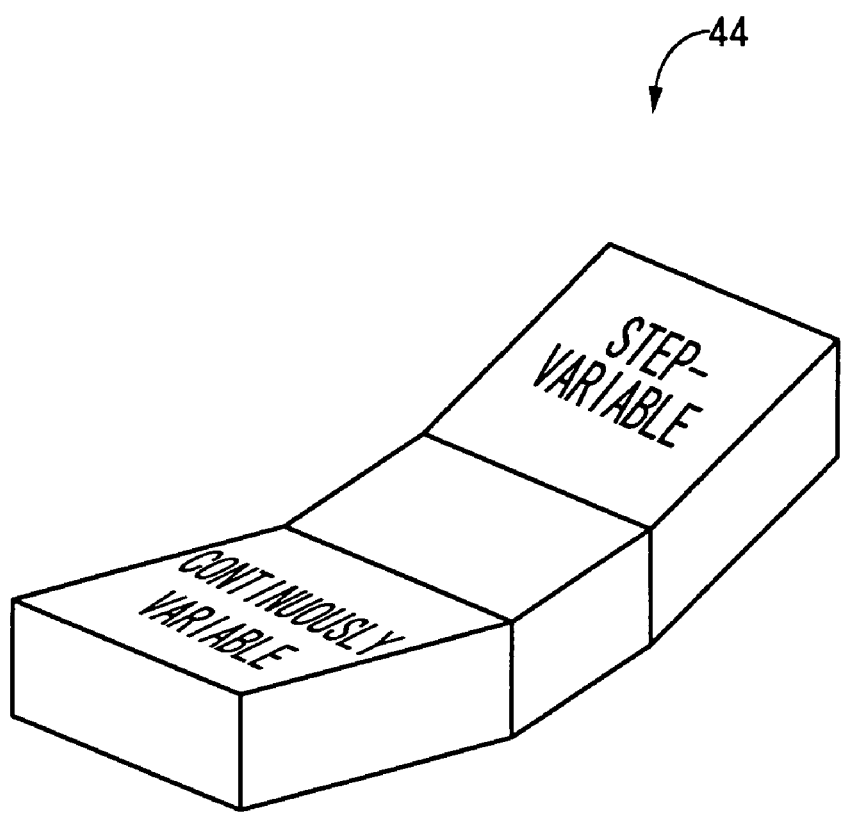
FIG. 16 is a view showing an example of a manually operable shifting-state selecting device in the form of a seesaw switch operated by a user to select the shifting state.
Figure 17:
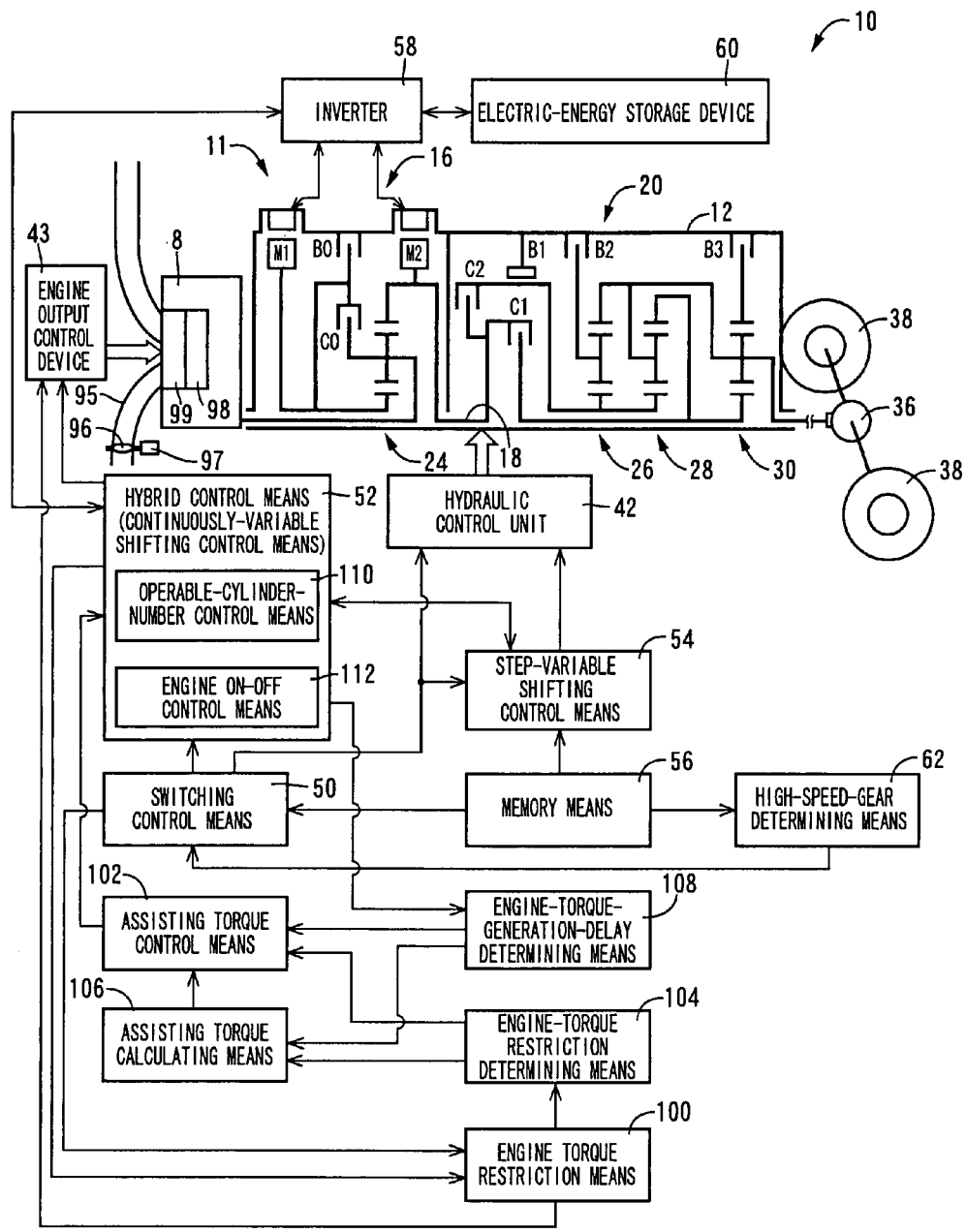
FIG. 17 is a functional block diagram illustrating major control functions of the electronic control device of FIG. 4 of a vehicular drive system according to a further embodiment of the invention.

FIG. 16 shows an example of a seesaw switch 44 (hereinafter referred to as "switch 44") functioning as a shifting-state selecting device manually configured to be operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 17. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Embodiment 4

In an embodiment shown in FIG. 17, the engine 8 is a variable-cylinder engine wherein the number of operable cylinders is variable by cutting a fuel supply to selected one or ones of the cylinders, for holding the selected cylinder or cylinders in the non-operated state, depending upon a load acting on the engine 8. During running of the vehicle under a low load, for example, the engine 8 is operated in a partial-cylinder operating mode (reduced-cylinder-number operating mode or no-cylinder operating mode) in which the fuel supply to at least one or all of the cylinders is cut to reduce the number of the operable cylinders, so that the amount of fuel consumption is reduced. Upon starting or abrupt acceleration of the vehicle, or during running of the vehicle under a medium or high load, the engine 8 is operated in all-cylinder operating mode in which all of the cylinders are held in the operated state to provide a desired output.

Referring to FIG. 17, the hybrid control means 52 includes functional means in the form of engine-output control means for applying a selected one or a selected combination of commands for controlling the engine 8 so as to provide a desired output, to an engine output control device 43. These commands consist of a command to control the throttle actuator 97 for opening and closing the electronic throttle valve 96; a command to control the fuel injecting device 98 for controlling the amount and timing of fuel injection; and a command to control the ignition device 99 such as an igniter for controlling the timing of ignition. For example, the hybrid control means 52 is basically arranged to drive the throttle actuator 50 on the basis of the accelerator pedal operating amount $A_{CC}$ and according to a stored predetermined relationship (not shown) between the operating amount $A_{CC}$ and an opening angle $\theta_{TH}$ of the electronic throttle valve 96, such that the opening angle $\theta_{TH}$ increases with an increase of the operating amount $A_{CC}$. According to the commands received from the hybrid control means 52, the engine output control device 43 controls the fuel injecting device 98 to inject the fuel, and controls the ignition device 99 such as the igniter to ignite the fuel, as well as controls the throttle actuator 97 to open and close the electronic throttle valve 96.

The hybrid control means 52 further includes operable-cylinder-number control means 110 for changing the number of the operable cylinders of the engine 8 to control the output of the engine 10. The operable-cylinder-number control means 110 is configured to determine the number of the operable cylinders on the basis of the vehicle state represented by the vehicle speed V and the accelerator pedal operating amount $A_{CC}$ and according to a stored predetermined relationship between the number of the operable cylinders and the vehicle state, and to establish the determined number of the operable cylinders. The predetermined relationship is obtained by experimentation such that the number of the operable cylinders is comparatively small during load-load running of the vehicle such as constant-speed running, and is comparatively large during medium- or high-load running of the vehicle such as starting of the vehicle or abruptly accelerating running of the vehicle with a large amount of operation of the accelerator pedal.

The operable-cylinder-number control means 110 is arranged to cut the fuel supply from the fuel injecting device 98 to the selected at least one or all of the cylinders for establishing the partial-cylinder operating mode, or to supply the fuel from the fuel injecting device 98 to all of the cylinders for establishing the all-cylinder operating mode. Where the fuel supply from the fuel injecting device 98 to all of the cylinders is cut, the engine is placed in a so-called "fuel-cut mode". Thus, the hybrid control means 52 is arranged to change the number of the operable cylinders of the engine 8 on the basis of the vehicle state, for changing the operating state of the engine 8 within a range from the fuel-cut mode to the all-cylinder operating mode.

Referring back to FIG. 6, the solid line A indicates the drive-power-source switching boundary line which is used to switch the vehicle drive power source between the engine 8 and the electric motor (e.g., second electric motor M2), that is, which defines the engine drive region for selecting the engine drive mode in which the engine 8 is used as the vehicle drive power source for starting and driving the vehicle, and the motor drive region for selecting the motor drive mode in which the second electric motor M2 as the vehicle drive power source. This boundary line (solid line A) shown in FIG. 6, which is a stored predetermined relationship for switching between the engine drive mode and the motor drive mode, is an example of a drive-power-source switching map represented in the two-dimensional coordinate system defined by the axis of the vehicle speed V and the axis of the drive-power-source related value in the form of the output torque $T_{OUT}$. This drive-power-source switching map is stored in the memory means 56, together with the shifting boundary line map (shifting map) indicated by solid and on-dot chain lines in FIG. 6.

The hybrid control means 52 is configured to determine whether the vehicle state represented by the vehicle speed V and the required output torque $T_{OUT}$ lies in the motor drive region or engine drive region defined by the drive-power-source switching map of FIG. 6, or not, for example. As is apparent from FIG. 7, the hybrid control means 52 selects the motor drive mode in a low-load running region in which the engine operating efficiency is generally lower than in a high-torque running region, and in which the output torque $T_{OUT}$ or engine torque $T_E$ is comparatively small or the vehicle speed V is comparatively low. Accordingly, the vehicle is usually started in the motor drive mode. However, the vehicle may be started with the engine where the accelerator pedal is operated by an amount so large as to cause an increase of the required output torque $T_{OUT}$ or engine torque $T_E$ beyond the motor drive region represented by the drive-power-source switching map of FIG. 6.

For preventing a dragging phenomenon of the engine 8 for thereby improving the fuel economy during running of the vehicle in the motor drive mode, the hybrid control means 52 controls the first electric motor speed $N_{M1}$ to be negative, with the first electric motor M1 kept in a freely rotatable state, for example, by utilizing the electric CVT function (differential function) of the differential portion 11, so that the engine speed $N_E$ is kept zero or substantially zero owing to the differential function of the differential portion 11.

For switching the vehicle drive mode between the engine drive mode and the motor drive mode, the hybrid control means 52 appropriately switch the operating state of the engine 8 between the operated and non-operated modes. For this purpose, the hybrid control means 52 further includes engine on-off control means 112 which is configured to turn on or off the engine 8, when the vehicle drive mode is switched by the hybrid control means 52, between the motor drive mode and the engine drive mode on the basis of the vehicle state and according to the drive-power-source switching map of FIG. 6, for example.

Where the vehicle state is changed from point "a" in the motor drive region to point "b" or "b'" in the engine drive region with an increase of the required output torque $T_{OUT}$ by operation of the accelerator pedal, as indicated by solid line B, the engine on-off control means 112 energizes the first electric motor M1 for raising the first electric motor speed $N_{M1}$, namely, for enabling the first electric motor M1 to function as a starter motor, to raise the engine speed $N_E$ and activate the ignition device 99 when the engine speed $N_E$ has been raised to a predetermined value $N_E'$ at which the engine 8 can be kept operated by itself. Thus, the engine 8 is started by the engine on-off control means 112, to change the drive mode from the motor drive mode to the engine drive mode under the control of the hybrid control means 52. The engine on-off control means 112 may be arranged to rapidly raise the first electric motor speed $N_{M1}$ for rapidly raising the engine speed $N_E$ to the predetermined value $N_E'$, so that starting vibration of the engine is reduced owing to a rapid increase of the engine speed $N_E$ through a resonance range not higher than the idling speed $N_{EIDL}$.

The engine on-off control means 122 is further configured to command the fuel injecting device 98 for stopping the fuel supply, that is, for implementing the fuel cut to thereby turn off the engine 8, where the vehicle state is changed from the point "b" or "b'" in the engine drive region to the point "a" in the motor drive region with a releasing action of the accelerator pedal, as indicated by the solid line B of FIG. 6. The engine on-off control means 112 may be arranged to rapidly lower the first electric motor speed $N_{M1}$ for rapidly lower the engine speed $N_E$ to zero or substantially zero, so that stopping vibration of the engine is reduced owing to a rapid drop of the engine speed $N_E$ through the resonance range. Alternatively, the engine on-off control means 112 is arranged to lower the first electric motor speed $N_{M1}$ for lowering the engine speed $N_E$, before implementing the fuel cut, and to implement the fuel cut for turning off the engine 8 when the engine speed $N_E$ has been lower to the predetermined value $N_E'$.

The hybrid control means 52 is further configured to perform a so-called "engine assisting" control for assisting the engine 8 operating in the engine drive region, by operating the second electric motor M2 for transmitting an assisting torque to the drive wheels 38, with an electric energy supplied from the first electric motor M1 through the above-descried electric path or from the electric energy storage device 60. Thus, the engine drive mode includes a drive mode in which the vehicle is driven by the engine assisted by the electric motor.

The hybrid control means 52 is further configured to hold the engine in the operated state by the electric CVT function of the differential portion 11, irrespective of whether the vehicle is stationary or running at a low speed. Where the first electric motor M1 is required to be operated to charge the electric energy storage device 60 due to reduction of the stored electric energy amount SOC, while the vehicle is stationary, for example, the first electric motor M1 is driven by the engine 8, and the first electric motor speed $N_{M1}$ is raised, while on the other hand the second electric motor speed $N_{M2}$ influenced by the vehicle speed V is zeroed (or substantially zeroed) since the vehicle is stationary. In this case, however, the engine speed $N_E$ is held at a value permitting the engine 8 to be kept operated, by the electric CVT function of the power distributing mechanism 16 under the control of the hybrid control means 52, The hybrid control means 52 is further configured to hold the engine speed $N_E$ constant or at a suitable value by controlling the first electric motor speed $N_{M1}$ and/or the second electric motor speed $N_{M2}$ by the electric CVT function of the differential portion 11, irrespective of whether the vehicle is stationary or running. In other words, the hybrid control means 52 is able to hold the first electric motor speed $N_{M1}$ and/or the second electric motor speed $N_{M2}$ at a suitable value or values, while the engine speed $N_E$ is held constant or at the suitable value. To raise the engine speed $N_E$, for instance, the hybrid control means 52 raises the first electric motor speed $N_{M1}$ while the second electric motor speed $N_{M2}$ influenced by the vehicle speed V (speed of the drive wheels 38) is held substantially constant, as is apparent from the collinear chart of FIG. 3.

Like the transmission mechanism 10 (differential portion 11 or power distributing mechanism 16) according to the preceding embodiment, the transmission mechanism 10 according to the present embodiment is also switchable between the continuously-variable shifting state (differential state) and the step-variable shifting state (locked state), and the switching control means 50 selects one of the continuously-variable and step-variable shifting states, on the basis of the vehicle state, and switches the differential portion 11 to the selected shifting state.

When the transmission mechanism 10 is switched between the continuously-variable and step-variable shifting states under the control of the switching control means 50, with releasing and engaging actions of the switching clutch C0 or brake B0, the engaging torque of the switching clutch C0 or brake B0 engaged to establish the step-variable shifting state of the transmission mechanism 10 and the reaction torque of the first electric motor M1 in the continuously-variable shifting state of the transmission mechanism 10 change in the respective opposite directions.

Since the power distributing mechanism 16 is arranged to distribute the engine torque $T_E$ to the first electric motor M1 and the power transmitting member 18, the reaction torque of the first electric motor M1 and the torque transmitted through the switching clutch C0 or brake B0 correspond to the engine torque $T_E$. Therefore, a change of the engine torque $T_E$ causes a change of the reaction torque of the first electric motor M1 or the transmitted torque of the switching clutch C0 or brake B0.

For assuring smooth changes of the reaction torque of the first electric motor M1 and the engaging torque of the switching clutch C0 or brake B0 in the respective opposite directions upon switching of the power distributing mechanism 16 between the differential state and the locked state, the control of the reaction torque of the first electric motor M1 and the releasing and engaging actions of the switching clutch C0 or brake B0 are suitably timed with respect to each other, according to predetermined timing data.

Where the transmission mechanism 10 is switching between the continuously-variable and step-variable shifting states as a result of a change of the vehicle state from the point "a" to the point "b", with an operation of the accelerator pedal, as indicated by the solid line B of FIG. 6, for example, the engine torque $T_E$ changes with a change of the required output torque $T_{OUT}$, the engaging torque of the clutch C0 or brake B0 and the reaction torque of the first electric motor M1 change in the respective opposite directions at the predetermined timing. If the engine torque $T_E$ changes during the changes of the engaging torque and the reaction torque, these two torques do not smoothly change in the opposite directions, giving rise to a risk of generation of a shock upon switching of the transmission mechanism 10 between the continuously-variable and step-variable shifting states. This shock is serious due to an increase of the engine torque $T_E$ particularly when the transmission mechanism 10 is switched from the continuously-variable shifting state to the step-variable shifting state, that is, when the power distributing mechanism 16 is switched from the differential state to the locked state.

In view of the above, engine torque restricting means 100 is provided to restrict the engine torque $T_E$ during a decrease of the reaction torque of the first electric motor M1 and an increase of the engaging torque of the switching clutch C0, for the purpose of reducing the switching shock upon switching of the power distributing mechanism 16 from the differential state to the locked state by the engaging action of the switching clutch C0. Namely, the engine torque restricting means 100 is configured to minimize the engine torque $T_E$ during the decrease of the reaction torque of the first electric motor M1 and the increase of the engaging torque of the switching clutch C0. For instance, the engine torque restricting means 100 is arranged to command the engine output control device 43, for reducing the opening of the electronic throttle valve 71 or the amount of fuel supply from the fuel injecting device 98, or retarding the timing of ignition of the engine 8 by the ignition device 99, during a period of the engaging action of the switching clutch C0 under the control of the switching control means 50, for temporarily reducing the engine torque $T_E$, for preventing an increase of the engine torque $T_E$.

For instance, the engine torque restricting means 100 restricts a change of the engine torque $T_E$, when the amount of change of the engine torque $T_E$ is larger than a stored predetermined value, that is, when the rate of change of the engine torque $T_E$ is larger than a stored predetermined value. The predetermined value of the rate of change of the engine torque $T_E$ is an upper limit of the amount of change per unit time of the engine toque $T_E$ above which the shock upon switching of the power distributing mechanism 16 from the differential state to the locked state must be reduced. This upper limit is obtained by experimentation and stored in memory. The engine torque control means 100 is further configured to estimate the engine torque $T_E$ on the basis of the actual accelerator pedal operating amount $A_C C$ (throttle valve opening angle $\theta_{TH}$) and according to a stored predetermined relationship between the operating amount $A_{CC}$ and the estimated engine torque $T_E$, and to calculate a rate of change of the engine torque $T_E$ on the basis of the estimated engine torque $T_E$.

To reduce the shock upon switching of the power distributing mechanism 16 from the differential state to the locked state by the engaging action of the switching clutch C0 as a result of an operation of the accelerator pedal, the hybrid control means 52 may be arranged to control the first electric motor speed $N_{M1}$ substantially in synchronization with the engine speed $N_E$, for controlling the timing of the decrease of the reaction torque of the first electric motor speed $N_{M1}$ and the increase of the engaging torque of the switching clutch C0 such that the switching clutch C0 is engaged under the control of the switching control means 50 while the relative rotating speed of the input and output members of the switching clutch C0 is restricted. In this case, the hybrid control means 52 must control the first electric motor M1 to generate the reaction torque corresponding to the engine torque $T_E$, until the switching clutch C0 has been brought into its engaged state. In the present embodiment, however, the first electric motor M1 is small-sized and is therefore unable to generate the reaction torque corresponding to the engine torque $T_E$ exceeding the upper limit TE1, so that the durability of the first electric motor M1 may be deteriorated if the engine torque $T_E$ exceeds the upper limit TE1 before the switching clutch C0 has been engaged.

In view of the drawback indicated above, the engine torque restricting means 100 is configured to restrict the engine torque $T_E$ so as not to exceed the upper limit TE1 before the switching clutch C0 has been engaged to switch the power distributing mechanism 16 from the differential state to the locked state, for the purpose of reducing deterioration of the durability of the first electric motor M1 while preventing an increase of the required size of the first electric motor M1. The engine torque restricting means 100 commands the engine output control device 43 to reduce the opening angle of the electronic throttle valve 96 or the amount of fuel supply from the fuel injecting device 98 or retarding the timing of ignition of the engine 8 by the ignition device 99, for thereby temporarily reducing the engine torque $T_E$ to a value not higher than the upper limit TE1.

Figure 18:
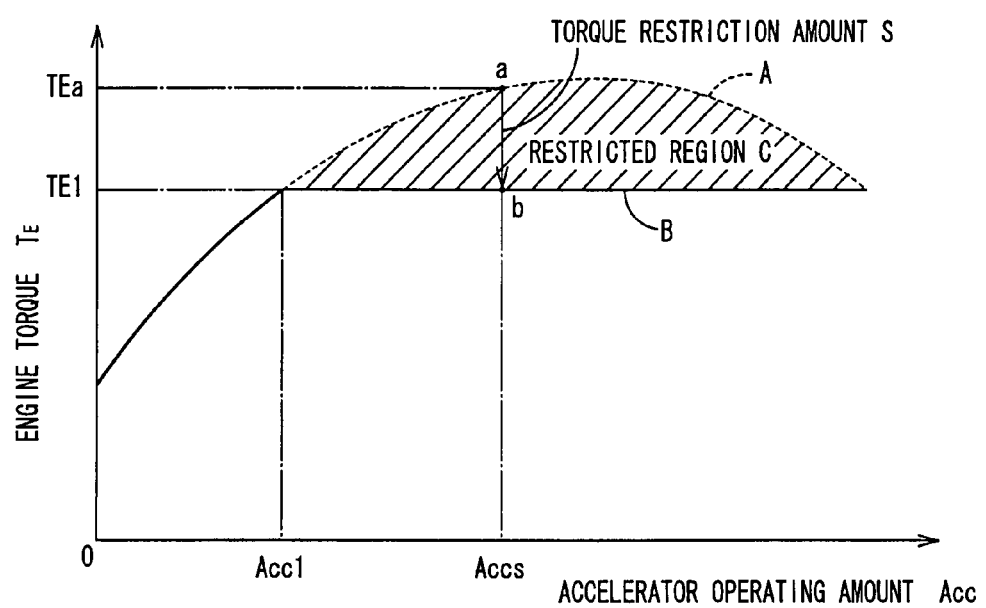
FIG. 18 is a view showing an example of the output characteristic of the engine torque in relation to the operating amount of the accelerator pedal, in the embodiment of FIG. 17.

Referring to FIG. 18, there is shown an example of an output characteristic of the engine torque $T_E$ in relation to the accelerator pedal operating amount $A_{CC}$. The engine torque restricting means 100 restricts the engine torque $T_E$, so as to change the output characteristic of the engine torque $T_E$ from that of broken line A to that of solid line B, for preventing the engine torque $T_E$ from exceeding the upper limit TE1 before completion of the engaging action of the switching clutch C0, namely, for enabling the first electric motor M1 to generate the reaction torque corresponding to the engine torque $T_E$, upon increasing of the accelerator pedal operating amount $A_{CC}$ beyond a predetermined upper limit $A_{CC1}$ and consequent switching of the power distributing mechanism 16 from the differential state to the locked state by the engaging action of the switching clutch C0. A hatched area indicated in FIG. 18 corresponds to a restricted region C of the vehicle state in which the required engine torque $T_E$ exceeds the upper limit TE1 as a result of the increase of the accelerator pedal operating amount beyond the upper limit $A_{CC1}$ and in which the actual engine torque $T_E$ is held below the predetermined upper limit TE1 to reduce the deterioration of durability of the first electric motor M1 while preventing an increase of the required size of the first electric motor M1.

It is noted, however, that a region in which the engine torque $T_E$ is larger than the upper limit TE1 is not entirely the locked region (step-variable shifting region) in which the differential portion 11 must be placed in the step-variable shifting state. In other words, the region in which the engine torque $T_E$ is larger than the upper limit TE1 includes a restricted region D in which the differential portion 11 must be placed in the continuously-variable shifting state. The restricted region D will be described below.

In the continuously-variable shifting state of the differential portion 11, the engine speed $N_E$ is controlled without an influence by the vehicle speed V, by the electrically controlled differential shifting action of the differential portion 11. For example, the hybrid control means 52 holds the engine 8 in the operated state by the electric CVT function of the differential portion 11, irrespective of whether the vehicle is stationary or running at a low speed, so that the engine 8 can be held in the operated state for smooth starting of the vehicle with the engine, by the hybrid control means 52, in the continuously-variable shifting state of the differential portion 11, even in the absence of a mechanism (device) such as a clutch, or a torque converter or any other fluid-operated power transmitting device in the above-indicated power transmitting path, which mechanism includes input and output rotary members that are rotatable relative to each other.

In the step-variable shifting state of the differential portion 11, on the other hand, the engine 8 and the drive wheels 38 are connected to each other through a mechanical power transmitting path, and the engine speed $N_E$ is influenced by the vehicle speed V, so that the hybrid control means 52 is not able to hold the engine 8 in the operated state for starting the vehicle with the engine from the vehicle speed of zero or a very low value.

For the hybrid control means 52 to adequately control the continuously-variable shifting state of the differential portion 11, the first electric motor M1 must be able to generate the reaction torque corresponding to the engine torque $T_E$. In the present embodiment in which the first electric motor M1 is small-sized so that the first electric motor M1 is not able to generate the reaction torque corresponding to the engine torque $T_E$ exceeding the upper limit. TE1, the differential portion 11 is switched to the step-variable shifting state by the switching control means 50 when the accelerator pedal operating amount is large enough to cause the required output torque $T_{OUT}$ to exceed the limit value T1 or upper limit TE1 upon starting of the vehicle, for example. In this case, therefore, the vehicle may be started with the engine. In other words, it is necessary either to hold the differential portion 11 in the continuously-variable shifting state to permit the vehicle starting with the engine upon a large amount of operation of the accelerator pedal, without dealing with deterioration of durability of the first electric motor M1, or to increase the size of the first electric motor M1 so that the first electric motor M1 can generate the reaction torque corresponding to the engine torque $T_E$ exceeding the upper limit TE1, for the sole purpose of starting the vehicle with the engine.

In view of the above, the switching control means 50 is configured not to switch the differential portion 11 from the continuously-variable shifting state (differential state) to the step-variable shifting state (locked state) even where the vehicle state lies in the above-indicated restricted region D (even where the differential portion 11 should be switched to the step-variable shifting state (locked state), if the actual vehicle speed V is not higher than the predetermined value V2. This value V2 is a stored predetermined lower limit which corresponds to the idling speed $N_{IDL}$ and above which the engine 8 can be held operated by itself. This lower limit V2 is used to determine whether the engine speed $N_E$ influenced by the vehicle speed V in the step-variable shifting state of the differential portion 11 is higher than the idling speed $N_{IDL}$ or not.

For reducing the deterioration of durability of the first electric motor M1 while preventing an increase of the required size of the first electric motor M1, and for permitting adequate starting of the vehicle with the engine 8 in the continuously-variable shifting state of the differential portion 11 under the control of the hybrid control means 52, the engine torque restricting means 100 is configured to command the engine output control device 43, for temporarily reducing or restricting the engine torque $T_E$ to a value not higher than the upper limit TE1, when the vehicle is started with the engine 8 at the vehicle speed not higher than the predetermined value V2.

In other words, the restricted region D of the vehicle state is considered to be a region in which the engine torque $T_E$ is restricted to the upper limit TE1 or lower by the engine torque control means 100, to prevent the switching control means 50 from switching the differential portion 11 to the step-variable shifting state as a result of the increase of the engine torque $T_E$ beyond the upper limit TE1.

The restricted region C indicated by the hatched area in FIG. 18 is a region of the vehicle state in which the required engine torque $T_E$ exceeds the upper limit TE1 as a result of an operation of the accelerator pedal by an amount not smaller than the predetermined value $A_{CC1}$ and in which the actual engine torque $T_E$ is held below the predetermined upper limit TE1, to hold the differential portion 11 in the continuously-variable shifting state. Thus, the engine torque restricting means 100 restricts the engine torque $T_E$, and changes the output characteristic of the engine torque $T_E$ from that of the broken line A of FIG. 18 to that of the solid line B, when the amount of operation of the accelerator pedal upon starting of the vehicle with the engine has exceeded the predetermined value $A_{CC1}$.

FIG. 11 indicates an example of the continuously-variable shifting region (differential-state region) and the step-variable shifting region (locked-state region) shown in FIGS. 6 and 7, as represented in the two-dimensional coordinate system defined by the vehicle speed V and the engine torque $T_E$. The hatched area in FIG. 11 corresponds to the restricted region D in which the vehicle speed V is not higher than the predetermined value V2 while the required engine torque $T_E$ is larger than the predetermined upper limit TE1 and in which the actual engine torque $T_E$ is held below the predetermined upper value TE1 to hold the differential portion 11 in its continuously-variable shifting state. Namely, for adequately starting the vehicle with the engine, the switching control means 50 should not switch the differential portion 11 to the step-variable shifting state (locked state), so that the engine torque $T_E$ must be restricted so as to be held below the predetermined upper limit TE1, in the restricted region D of the vehicle state.

It is noted that the restriction of the engine torque $T_E$ by the engine torque restricting means 100 results in a possibility of reduction of the torque to be transmitted to the drive wheels 38, which adversely influence the acceleration of the vehicle. When the accelerator pedal is operated, for instance, it is desirable that the vehicle acceleration is increased by a rapid increase of the vehicle drive torque to the required value. However, the restriction of the engine torque $T_E$ by the engine torque restricting means 100 upon switching of the differential portion 11 from the continuously-variable shifting state to the step-variable shifting state as a result of the operation of the accelerator pedal gives rise to a risk of failure to obtain the desired acceleration of the vehicle in spite of the operation of the acceleration pedal.

In view of the risk indicated above, assisting torque control means 102 is provided for controlling the second electric motor M2 to perform an engine assisting operation for providing an assisting torque to compensate for the reduction of the engine torque $T_E$ by the engine torque restricting means 100.

Described in detail, engine-torque-restriction determining means 104 is provided for determining whether the engine torque $T_E$ is being restricted by the engine torque restricting means 100 or not, upon switching of the power distributing mechanism 16 from the differential state to the locked state by the engaging action of the switching clutch C0. For instance, this determination by the engine-torque-restriction determining means 104 as to whether the engine torque $T_E$ is being restricted by the engine torque restricting means 100 or not is made by determining whether the engine output control device 43 has been commanded by the engine torque restricting means 100 to temporarily reduce the engine torque $T_E$ during the period of the engaging action of the switching clutch C0 under the control of the switching control means 50.

The engine-torque-restriction determining means 104 is further configured to determine whether the engine torque $T_E$ is being restricted by the engine torque restricting means 100 upon starting of the vehicle with the engine, or not. For example, this determination by the engine-torque-restriction determining means 104 as to whether the engine torque $T_E$ is being restricted by the engine torque restricting means 100 or not is made by determining whether the engine output control device 43 has been commanded by the engine torque restricting means 100 to temporarily reduce the engine torque $T_E$ upon starting of the vehicle with the vehicle under the control of the hybrid control means 52, or not.

Assisting torque calculating means 106 is provided for calculating an amount of the assisting torque to be provided by the assisting torque control means 102. Described in detail, the assisting torque calculating means 106 is configured to calculate an amount of restriction of the engine torque $T_E$ by the engine torque restricting means 100, and to calculate the amount of the assisting torque on the basis of the calculated amount of restriction of the engine torque $T_E$ and according to a predetermined relationship S between the amount of restriction of the engine torque $T_E$ and the amount of the assisting torque, which relationship S is obtained by experimentation.

Where the engine torque $T_E$ corresponding to an actual operating amount $A_{CCS}$ of the accelerator pedal is reduced by the engine torque restricting means 100, from point "a" on the broken line A of FIG. 18 to point "b" on the solid line B as a result of the output characteristic of the engine torque $T_E$, for instance, the assisting torque calculating means 106 calculates, as the restriction amount S, a difference (TEa−TE1) between the torque values at the points "a" and "b".

Figure 19:
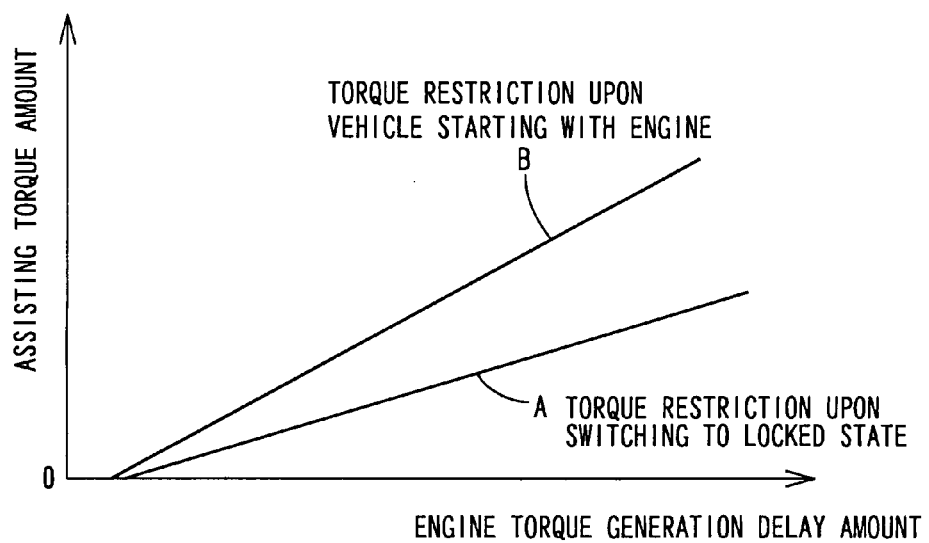
FIG. 19(a) is a view indicating examples of a relationship obtained by experimentation between an assisting torque and a torque restriction amount.
FIG. 19(b) is a view indicating examples of a relationship obtained by experimentation between the assisting torque and a torque generation delay amount.
Figure 19:
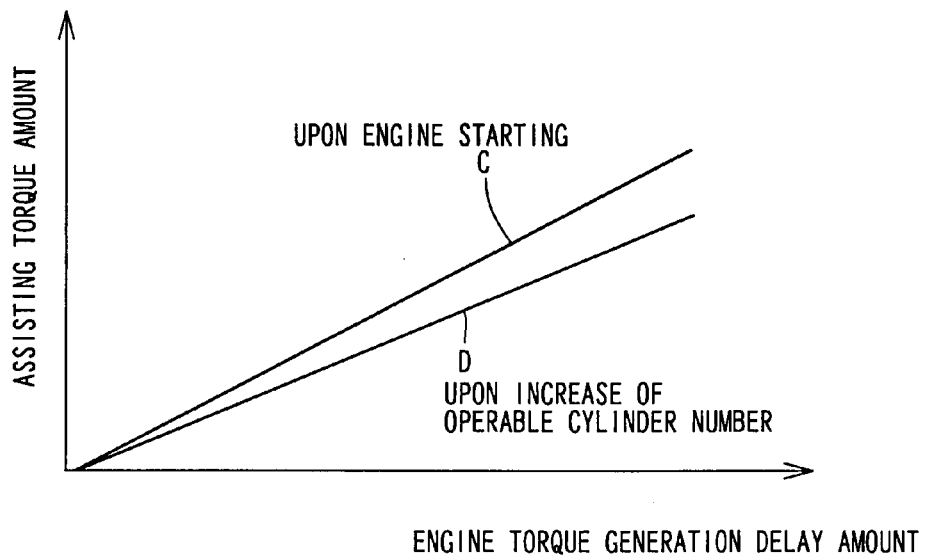

Referring to FIG. 19(*a*), there are shown examples of the relationship S between the torque restriction amount and the assisting torque amount, which relationship S is formulated such that the assisting torque amount increases with an increase of the torque restriction amount. Solid line A in FIG. 19(*a*) represents an example of the relationship between an assisting torque amount Aa and the torque restriction amount where the engine torque $T_E$ is restricted by the engine torque restricting means 100 upon switching of the power distributing mechanism 16 to the locked state, while Solid line B in FIG. 19(*a*) represents an example of the relationship between an assisting torque amount Ab and the torque restriction amount where the engine torque $T_E$ is restricted by the engine torque restricting means 100 upon starting of the vehicle with the engine. The amount of shortage of the vehicle drive torque due to the engine torque restriction is considered larger upon vehicle starting with the engine from the vehicle speed V of zero or a very low value. In view of this consideration, the present embodiment is arranged such that the assisting torque amount (represented by the solid line B) for a given amount of the engine torque restriction upon vehicle starting with the engine is made larger than that (represented by the solid line A) upon switching of the power distributing mechanism 16 to the locked state. The assisting torque calculating means 106 obtains an assisting torque amount As by summing the assisting torque amounts Aa and Ab.

The assisting torque calculating means 106 is further configured to calculate an assisting length of time on the basis of the vehicle state such as the amount of shortage of the vehicle drive torque and the speed ratio γ upon operation of the assisting torque control means 102, and according to a predetermined relationship between the torque assisting length of time and the vehicle state, which relationship is obtained by experimentation. For example, the assisting torque calculating means 106 obtains, as the assisting length of time, a period of time during which the engine-torque-restriction determining means 104 has an affirmative determination that the engine torque $T_E$ is being restricted by the engine torque restricting means 100.

When the engine-torque-restriction determining means 104 has determined that the engine torque $T_E$ is being restricted by the engine torque restricting means 100, the assisting torque control means 102 commands the hybrid control means 52 to perform the engine assisting operation for assisting the engine 8, such that the second electric motor M2 provides the assisting torque As calculated by the assisting torque calculating means 106, for the assisting length of time also calculated by the assisting torque calculating means 106. Accordingly, the amount of reduction of the vehicle drive torque to be transmitted to the drive wheels 38 due to the restriction of the engine torque $T_E$ by the engine torque restricting means 100 is reduced to reduce the deterioration of acceleration of the vehicle.

If the generation of the engine torque $T_E$ is delayed during the output control of the engine 8 by the hybrid control means 52, there is a possibility that the transmission of the vehicle drive torque to the drive wheels 38 is delayed, with a result of an adverse influence of the vehicle acceleration. When the accelerator pedal is operated, for instance, it is desirable that the vehicle acceleration is increased by a rapid increase of the vehicle drive torque to the required value. However, the engine torque $T_E$ is not generated before the engine 8 is started by the engine on-off control means 112 upon switching of the vehicle drive mode from the motor drive mode to the engine drive mode as a result the operation of the accelerator pedal. Thus, the generation of the engine torque $T_E$ may be delayed, resulting in a delayed rise of the vehicle drive torque, and a consequent failure to obtain the desired vehicle acceleration.

The generation of the engine torque $T_E$ may be delayed not only upon starting of the engine 8 by the engine on-off control means 112, but also upon increasing of the number of the operable cylinders of the engine 8 by the operable-cylinder-number control means 110. Where the number of the operable cylinders of the engine 8 is increased by the operable-cylinder-number control means 110, a portion of the engine torque $T_E$ which corresponds to the increase of the number of the operable cylinders is not generated until the cylinder or cylinders which has/have been subjected to the fuel cut thereto is brought to the operated state. In this case, too, the generation of the engine torque $T_E$ is delayed.

In view of the above, the assisting torque control means 102 is configured to control the second electric motor M2 such that the engine assisting operation is performed so as to compensate for the above-indicated delay of generation of the engine torque $T_E$.

Described in detail, the assisting torque control means 102 is configured to control the second electric motor M2 to perform the engine assisting operation for compensating the delay of generation of the engine torque $T_E$ upon starting of the engine 8 by the engine on-off control means 112. The assisting torque control means 102 is further configured to control the second electric motor M2 to perform the engine assisting operation for compensating the delay of generation of the engine torque $T_E$ upon increasing of the number of the operable cylinders of the engine 8 by the operable-cylinder-number control means 110.

Engine-torque-generation-delay determining means 108 is provided for determining whether the generation of the engine torque $T_E$ is expected to be delayed or not. For instance, the engine-torque-generation-delay determining means 108 is configured to determine whether the generation of the engine torque $T_E$ is delayed upon starting of the engine 8 by the engine on-off control means 112 or not. The determination by the engine-torque-generation-delay determining means 108 as to whether the generation of the engine torque $T_E$ upon starting of the engine 8 by the engine on-off control means 112 is delayed or not is made by determining whether the engine on-off control means 112 has determined to start the engine 8 as a result of the determination by the hybrid control means 52 to switch the vehicle drive mode from the motor drive mode to the engine drive mode according to a change of the vehicle state.

The engine-torque-generation-delay determining means 108 is further configured to determine whether the generation of the engine torque $T_E$ is delayed upon increasing of the number of the operable cylinders of the engine 8 by the operable-cylinder-number control means 110. The determination by the engine-torque-generation-delay determining means 108 as to whether the generation of the engine torque $T_E$ upon increasing of the number of the operable cylinders of the engine 8 by the operable-cylinder-number control means 110 is delayed or not is made by determining whether the operable-cylinder-number control means 110 has initiated to increase the number of the operable cylinders of the engine 8 as a result of the determination by the hybrid control means 52 to increase the number of the operable cylinders according to a change of the vehicle state.

When the engine-torque-generation-delay determining means 108 has determined that the generation of the engine torque $T_E$ is expected to be delayed, the assisting torque calculating means 106 calculates an amount of delay of generation of the engine torque $T_E$, and to calculate the assisting torque amount on the basis of the calculated engine torque generation delay amount and according to a predetermined relationship L between the assisting torque amount and the engine torque generation delay amount.

For example, the assisting torque calculating means 106 is configured to calculate an engine torque generation delay amount L on the basis of a length of time A from a moment of determination by the engine on-off control means 110 to start the engine 8 to a moment of actual ignition of the engine, or a length of time B from a moment of initiation of an operation to increase the number of the operable cylinders under the control of the operable-cylinder-number control means 110 to a moment at which the cylinder or cylinders which has/have been subjected to the fuel cut thereto is/are brought to the operated state. More precisely, the engine torque generation delay amount L is calculated on the basis of the length of time A, B and according to a predetermined relationship between the length of time A, B and the engine torque generation delay amount L which relationship is obtained by experimentation.

Referring to FIG. 19(b), there are shown examples of the relationship L between the engine torque generation delay amount and the assisting torque amount, which relationship L is formulated such that the assisting torque amount increases with an increase of the engine torque generation delay amount. Solid line C in FIG. 19(b) represents an example of the relationship between an assisting torque amount Ac and the engine torque generation delay amount upon starting of the engine 8 by the engine on-off control means 112, while Solid line D in FIG. 19(b) represents an example of the relationship between an assisting torque amount Ad and the engine torque generation delay amount under increasing of the number of the operable cylinders by the operable-cylinder-number control means 110. The amount of shortage of the vehicle drive torque upon starting of the engine 8 is considered larger. In view of this consideration, the present embodiment is arranged such that the assisting torque amount (represented by the solid line C) for a given amount of the engine torque generation delay amount upon starting of the engine 8 is made larger than that (represented by the solid line D) upon increasing of the number of the operable cylinders. The assisting torque calculating means 106 obtains a total assisting torque amount Al by summing the assisting torque amounts Ac and Ad.

The assisting torque calculating means 106 is configured to obtain, as the assisting length of time, a period of time from a moment of determination by the engine-torque-generation-delay determining means 108 that the engine torque $T_E$ is expected to be delayed, to a moment of actual generation of the engine torque $T_E$ as a result of ignition of the engine or completion of the increase of the number of the operable cylinders.

When the engine-torque-generation-delay determining means 108 has determined that the generation of the engine torque $T_E$ is expected to be delayed, the assisting torque control means 102 commands the hybrid control means 52 to control the second electric motor M2 to perform the engine assisting operation for assisting the engine 8, such that the second electric motor M2 provides the assisting torque amount Al calculated by the assisting torque calculating means 106, for the assisting length of time also calculated by the assisting torque calculating means 106. Accordingly, the amount of delay of transmission of the vehicle drive torque to the drive wheels 38 due to the delay of generation of the engine torque $T_E$ is reduced to reduce the deterioration of acceleration of the vehicle.

The assisting torque calculating means 106 is configured to not only calculate the assisting torque amounts As, Al on the basis of the torque restriction amount S and engine torque generation delay amount L, but also an assisting torque amount A' on the basis of a range of change $A_{CC}'$ ($=dA_{CC}/dt$) of the operating amount of the accelerator pedal, for example, such that the assisting torque amount A' increases with an increase of the rate of change $A_{CC}'$, and according to a predetermined relationship between the assisting torque amount A' and the range of change $A_{CC}'$, which relationship is obtained by experimentation. The assisting toque calculating means 106 obtains a total assisting torque amount $A_{ALL}$ by summing the assisting torque amounts As, Al and A'.

The assisting torque control means 102 commands the hybrid control means 52 to drive the second electric motor M2 for performing the engine assisting operation to assist the engine 8, such that the second electric motor M2 provides the total assisting torque amount $A_{ALL}$ calculated by the assisting torque calculating means 106.

Figure 20:
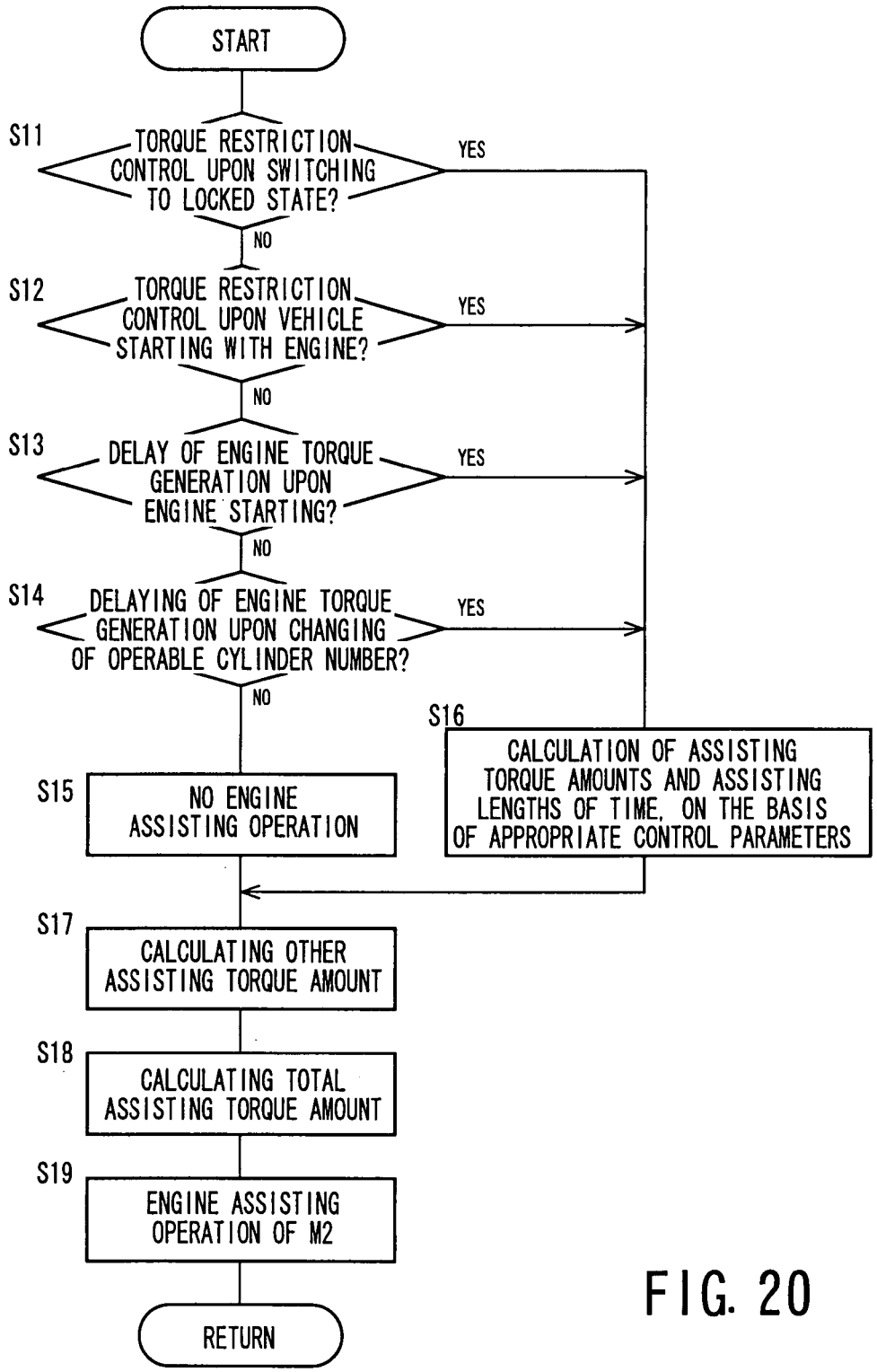
FIG. 20 is a flow chart illustrating an engine assisting operation executed by the electronic control device of FIG. 17 when the engine torque is restricted or when the generation of the engine torque is delayed.

Referring to the flow chart of FIG. 20, there is illustrated an engine assisting operation executed by the electronic control device 40 provided in the embodiment of FIG. 17 when the engine torque is restricted or when the generation of the engine torque is delayed. This control routine is repeatedly executed with a very short cycle time of several milliseconds to several tens of milliseconds, for example.

Figure 21:
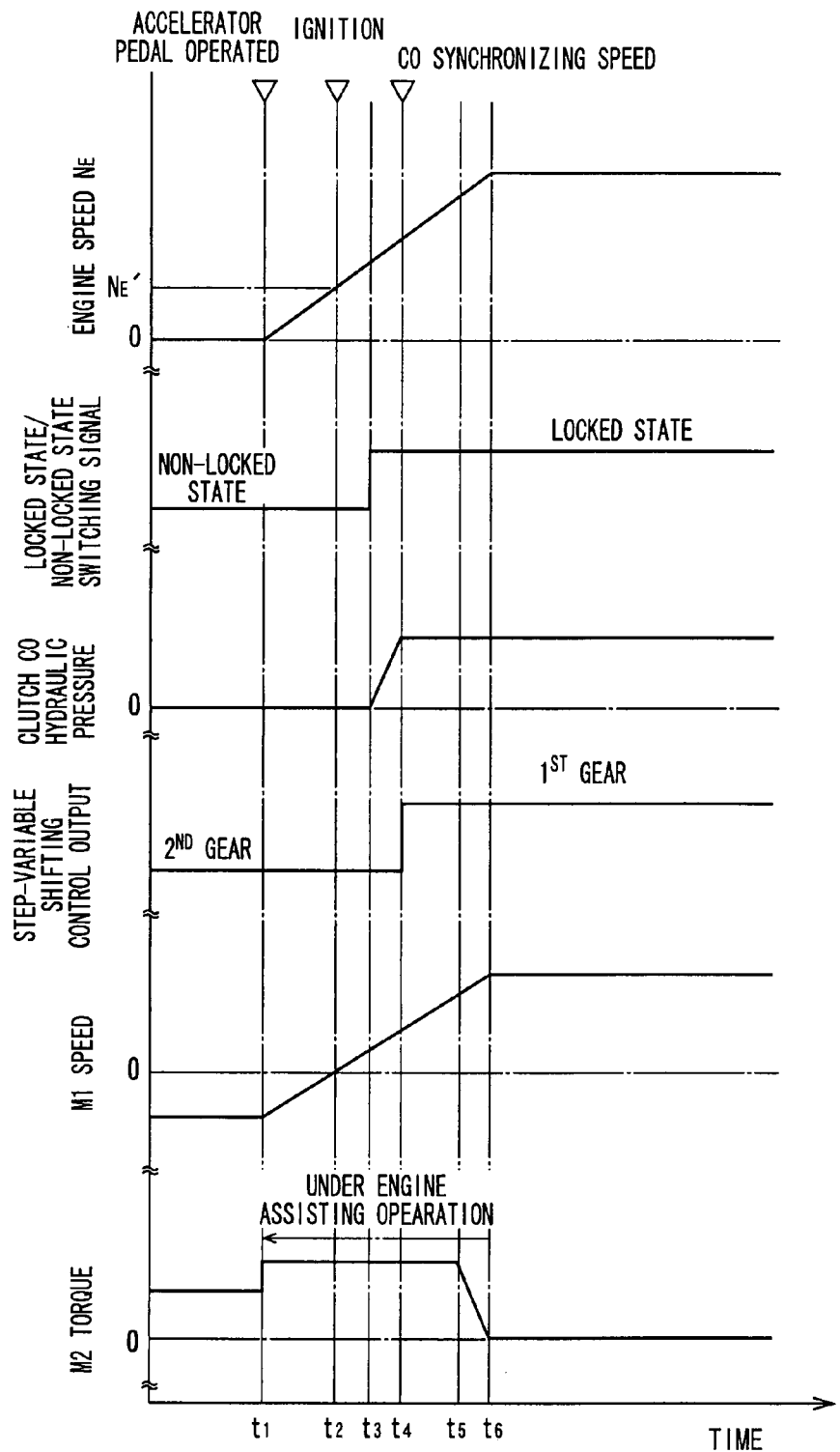
FIG. 21 is a time chart for explaining the engine assisting operation illustrated in the flow chart of FIG. 20, in the event of almost concurrent occurrence of switching of the vehicle drive mode from the motor drive mode to the engine drive mode due to a large amount of operation of the accelerator pedal during vehicle running in the motor drive mode, switching of the shifting state of the differential portion from the continuously-variable shifting state to the step-variable shifting state, and determination to effect a shift-down action of the automatic transmission portion.

FIG. 21 is a time chart for explaining the engine assisting operation illustrated in the flow chart of FIG. 20, in the event of almost concurrent occurrence of switching of the vehicle drive mode from the motor drive mode to the engine drive mode due to a change of the vehicle state from the point "a" to the point "b" as indicated by the solid line B in FIG. 6, as a result of a large amount of operation of the accelerator pedal during vehicle running in the motor drive mode; switching of the shifting state of the differential portion from the continuously-variable shifting state to the step-variable shifting state, and determination to effect a shift-down action of the automatic transmission portion 20.

Figure 22:
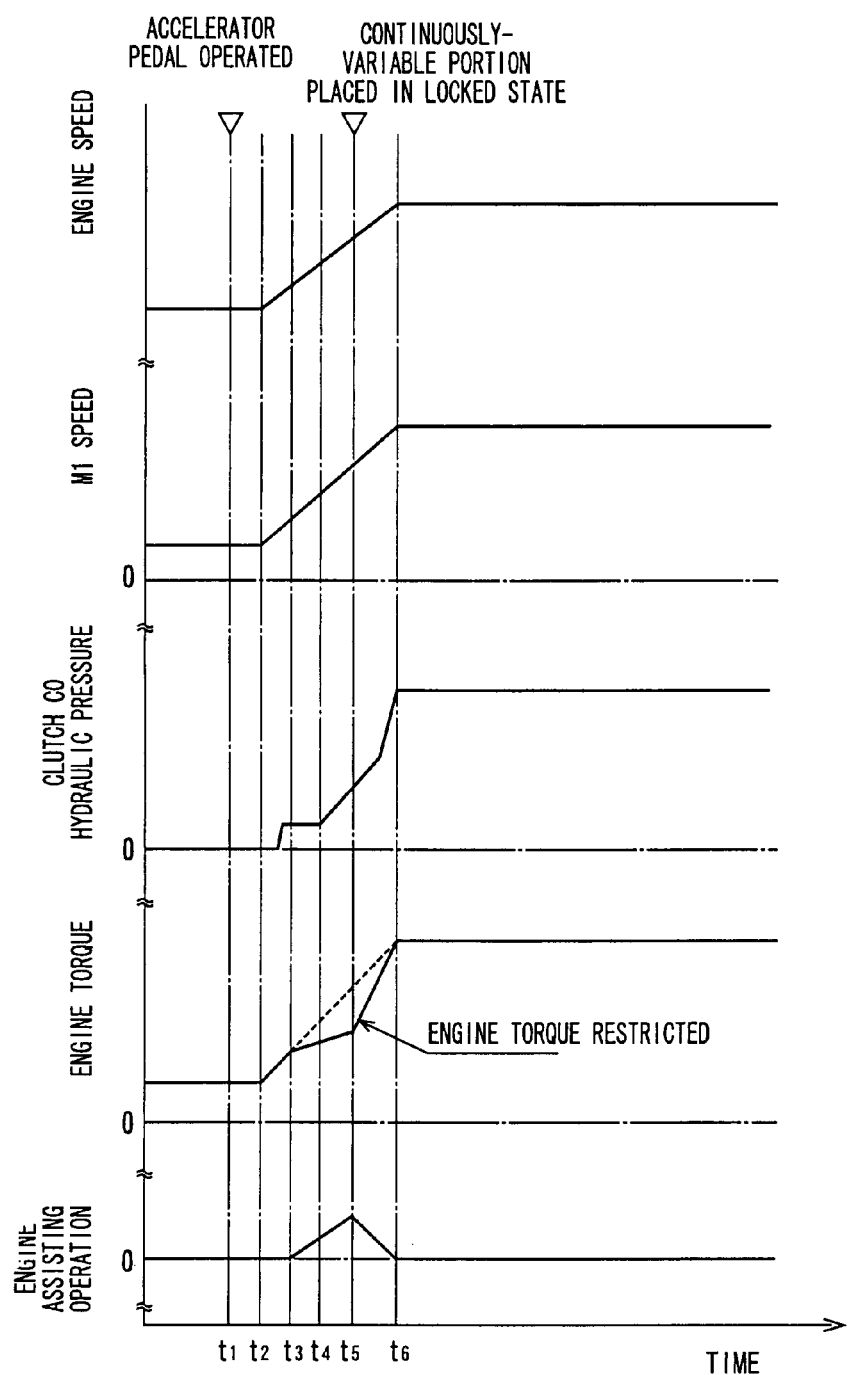
FIG. 22 is a time chart for explaining the engine assisting operation illustrated in the flow chart of FIG. 20, in the event of determination to switch the shifting state of the differential portion 11 from the continuously-variable shifting state (non-locked state) to the step-variable shifting state (locked state), due to a large amount of operation of the accelerator pedal during vehicle running in the engine drive mode.

FIG. 22 is a time chart for explaining the engine assisting operation illustrated in the flow chart of FIG. 20, in the event of determination to switch the shifting state of the differential portion 11 from the continuously-variable shifting state (non-locked state) to the step-variable shifting state (locked state), due to a change of the vehicle state from the point "b'" to the point "b", as indicated by the solid line B in FIG. 6, as a result of a large amount of operation of the accelerator pedal during vehicle running in the engine drive mode.

The engine assisting control routine is initiated with step S11 (hereinafter "step" being omitted) corresponding to the engine-toque-restriction determining means 104, to determine whether the engine torque restricting means 100 has commanded the engine output control device 43 to temporarily reduce the engine torque $T_E$ during an engaging action of the switching clutch C0 under the control of the switching control means 50. In the example of FIG. 22, the determination to switch the differential portion 11 from the continuously-variable shifting state (non-locked state) to the step-variable shifting state (locked state) by the engaging action of the switching clutch C0 as a result of a large amount of operation of the accelerator pedal is made at a point of time t1, and the engine torque $T_E$ is restricted for a period of time from a point of time t3 to a point of time t6 indicated in FIG. 22, upon switching of the differential portion 11 to the locked state.

If a negative determination is obtained in S11, the control flow goes to S12 corresponding to the engine-torque-restriction determining means 104, to determine whether the engine torque restricting means 100 has commanded the engine output control device 53 to temporarily reduce the engine torque $T_E$ upon starting of the vehicle with the engine under the control of the hybrid control means 52.

If a negative determination is obtained in S12, the control flow goes to S13 corresponding to the engine-torque-generation-delay determining means 108, to determine whether the generation of the engine torque $T_E$ is delayed upon starting of the engine 8 by the engine on-off control means 112. For example, the determination as to whether the generation of the engine torque $T_E$ upon starting of the engine 8 by the engine on-off control means 112 is delayed or not is made by determining whether the engine on-off control means 112 has determined to start the engine 8 as a result of the determination by the hybrid control means 52 to switch the vehicle drive mode from the motor drive mode to the engine drive mode according to a change of the vehicle state. At a point of time T1 in the example of FIG. 21, the determination to switch the differential portion 11 from the continuously-variable shifting state (non-locked state) to the step-variable shifting state (locked state) by the engaging action of the switching clutch C0 is made as a result of the large amount of operation of the accelerator pedal, and the determination to switch the vehicle drive mode from the motor drive mode to the engine drive mode, while at the same time the determination to shift-down the automatic transmission portion 20 from the second gear position to the first gear position If a negative determination is obtained in S13, the control flow goes to S14 corresponding to the engine-torque-generation-delay determining means 108, to determine whether the generation of the engine torque $T_E$ is delayed upon increasing of the number of the operable cylinders of the engine 8 by the operable-cylinder-number control means 110. For example, the determination as to whether the generation of the engine torque $T_E$ upon increasing of the number of the operable cylinders of the engine 8 by the operable-cylinder-number control means 110 is delayed or not is made by determining whether the operable-cylinder-number control means 110 has initiated to increase the number of the operable cylinders of the engine 8 as a result of the determination by the hybrid control means 52 to increase the number of the operable cylinders according to a change of the vehicle state.

If a negative determination is obtained in S14, the control flow goes to S15 corresponding to the assisting torque control means 102, in which no engine assisting operation is performed by the second electric motor M2 to compensate for the shortage of the vehicle drive torque due to the restriction of the engine torque $T_E$ or the delay of generation of the engine torque $T_E$.

If an affirmative determination is obtained in any one of S11-S14, the control flow goes to S16 corresponding to the assisting torque calculating means 106, to calculate the amount of the assisting torque provided by the second electric motor M2 and the assisting length of time. For instance, the assisting torque amount As is calculated on the basis of the amount S of the restriction of the engine torque $T_E$ (which restriction has been determined in S11 or S12) and according to the predetermined relationships S indicated in FIG. 19(a), and the length of restriction of the engine torque $T_E$ is calculated as the assisting length of time. Further, the assisting torque amount Al is calculated on the basis of the amount L of the delay of generation of the engine torque $T_E$ (which delay has been determined in S13 or S14) and according to the predetermined relationships L indicated in FIG. 19(b), and the period of time from the moment of determination of the delay to the moment of the actual generation of the engine torque $T_E$ is calculated as the assisting length of time.

S15 and S16 are followed by S17 corresponding to the assisting torque calculating means 106, to calculate the assisting torque amount A', in addition to the assisting torque amounts As and Al calculated in S16, on the basis of the rate of change $A_{CC}'$ (=$dA_{CC}$/dt) of the operating amount of the accelerator pedal, and according to the predetermined relationship obtained by experimentation.

The control flow then goes to S18 corresponding to the assisting torque calculating means 106, to calculate the total assisting torque amount $A_{ALL}$ by summing the assisting torque amounts As and Al calculated in S16 and the assisting torque amount A calculated in S17.

Then, S19 corresponding to the assisting torque control means 102 to command the hybrid control means 52 to drive the second electric motor M2 for performing the engine assisting operation to assist the engine 8, such that the second electric motor M2 provides the total assisting torque amount $A_{ALL}$ calculated in S18.

During a period of time from the point of time t1 to a point of time t2 indicated in FIG. 21, the switching clutch C0 is engaged to switch the shifting state from the continuously-variable shifting state (non-locked state to the step-variable shifting step (locked state), while at the same time the engine 8 is started in the continuously-variable shifting state, by the first electric motor M1 operated as the engine starter, with a smooth change of the first electric motor speed $N_{M1}$, before the shift-down action of the automatic transmission portion 20 from the second gear position to the first gear position. Accordingly, the vibration upon starting of the engine is reduced. At the point of time t2, the engine is ignited at the predetermined engine speed $N_E'$.

At the point of time t3 after the starting of the engine 8, the hydraulic control unit 42 is commanded to engage the switching clutch C0. As a result, the hydraulic pressure of the switching clutch C0 is increased during the period of time from the point of time t3 to a point of time t4. The engaging action of the switching clutch C0 is completed at the point of time t4, so that the engine speed $N_E$, the first electric motor speed $N_{M1}$ and the rotating speed of the power transmitting member 18 are made equal to each other. Accordingly, the input speed of the automatic transmission portion 20 (rotating speed of the power transmitting member 18) is held constant at the engine speed $N_E$.

At the following point of time t5, a shifting command is applied to the hydraulic control unit 42 to effect the shift-down action of the automatic transmission portion, that is, to effect the engaging actions of the appropriate combination of the hydraulically operated frictional coupling devices for establishing the first gear position. This shift-down action of the automatic transmission 20 is facilitated since the shift-down action is not effected concurrently with the switching of the differential portion 11 to the locked state. It is also noted that the shift-down action is effected while the engine speed $N_E$, first electric motor speed $N_{M1}$ and rotating speed of the power transmitting member 18 are equal to each other, so that the engine speed $N_E$ which usually changes during a shifting action of the automatic transmission portion 20 may be controlled by the first electric motor M1, according to a change of the rotating speed of the power transmitting member 18 which is determined by the vehicle speed V and the speed ratio γ of the automatic transmission portion 20. In this case, the automatic transmission portion 20 can be rapidly shifted down. Thus, upon concurrent determinations to change the shifting state, start the engine 8 and shift the automatic transmission portion 20 as a result of an operation of the accelerator pedal, these three events of operation are controlled so as to take place sequentially.

The generation of the engine torque $T_E$ is delayed with respect to the moment of determination to start the engine 8 as a result of the large amount of operation of the accelerator pedal, since the engine torque $T_E$ is generated at the point of time t2 or later with the ignition of the engine 8. A delayed rise of the vehicle drive torque during the operation of the accelerator pedal is not desired. To compensate for this delayed rise of the vehicle drive torque, the engine assisting operation of the second electric motor M2 is initiated at the point of time t1. The engine assisting operation of the second electric motor M2 is continued even after the point of time t3, to compensate for the reduction of the engine torque $T_E$ during the engaging action of the switching clutch C0 for switching the shifting state to the locked state from the point of time t3 to the point of time t4. In the example of FIG. 21, the engine assisting operation is performed up to the point of time t6, on the basis of the vehicle state such as the amount of shortage of the vehicle drive torque and the speed ratio γ. In the example of FIG. 22, the engine assisting operation of the second electric motor M2 is performed for the period of time from the point of time t3 to the point of time t6, during which the engine torque $T_E$ is restricted.

In the example of FIG. 21, the vehicle drive mode is switched from the motor drive mode to the engine drive mode, and the shifting state is changed to the locked state in the motor drive mode. In the example of FIG. 22, the shifting state is switched to the locked state in the engine drive mode. It is clear that the assisting torque amount and the assisting length of time are larger and longer in the example of FIG. 21 than in the example of FIG. 22. Thus, the assisting torque amount and length of time are determined on the basis of the vehicle state in which the engine assisting operation is performed, such as the amount of delay of generation of the engine torque $T_E$, condition of restriction of the engine torque $T_E$, amount of shortage of the vehicle drive torque, vehicle speed V, and rate of change $A_{CC}'$ of the accelerator pedal operating amount.

In the example of FIG. 21, the vehicle drive mode is switched from the motor drive mode to the engine drive mode, and the shifting state is switched to the locked state in the motor drive mode. In the example of FIG. 22, the shifting state is switched to the locked state in the engine drive mode. It is clear that the amount of the assisting torque and the assisting length of time are larger and longer in the example of FIG. 21 than in the example of FIG. 22. Thus, the assisting torque amount and assisting length of time are determined on the basis of the vehicle state in which the engine assisting operation is performed, such as: the amount of delay of generation of the engine torque $T_E$; the state in which the engine torque $T_E$ is restricted; the amount of shortage of the vehicle drive torque; the running speed V and speed ratio γ; and the rate of change $A_{CC}'$ of the accelerator pedal operating amount.

In the present embodiment described above, the assisting torque control means 102 performs the engine assisting operation by the second electric motor M2 during restriction of the engine torque $T_E$ by the engine torque restricting means 100, to compensate for the restriction of the engine torque $T_E$. Accordingly, the amount of reduction of the torque to be transmitted to the drive wheels 38 due to the restriction of the engine torque $T_E$ is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

The present embodiment is further arranged such that the engine torque restricting means 100 restricts the engine torque $T_E$ upon starting of the vehicle with the engine 8, for protecting the first electric motor M1 which generates the reaction torque corresponding to the engine torque $T_E$, and the assisting torque control means 102 performs the engine assisting operation by the second electric motor M2 during restriction of the engine torque $T_E$ by the engine torque restricting means 100, to compensate for the restriction of the engine torque $T_E$. Accordingly, the amount of reduction of the torque to be transmitted to the drive wheels 38 is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

The present embodiment is further arranged such that upon switching of the differential portion 11 (power distributing mechanism 16) from the differential state to the locked state by the engaging action of the switching clutch C0, the engine torque restricting means 100 restricts the engine torque $T_E$, and the assisting torque control means 102 performs the engine assisting operation by the second electric motor M2, to compensate for the restriction of the engine torque $T_E$, so that the amount of reduction of the torque to be transmitted to the drive wheels 38 is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

The present embodiment is further arranged such that the assisting torque control means 102 performs an engine assisting operation by the second electric motor M2, to compensate for a delay of generation of the engine torque $T_E$. Accordingly, a delay of transmission of the vehicle drive torque to the drive wheels 38 due to the delay of generation of the engine torque $T_E$ is reduced to reduce the deterioration of the vehicle acceleration, so that the amount of reduction of the torque to be transmitted to the drive wheels 38 is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

The present embodiment is further arranged such that the assisting torque control means 102 performs the engine assisting operation by the second electric motor to compensate for a delay of generation of the engine torque $T_E$ by a length of time required for starting of the engine 8 by the engine on-off control means 112. Accordingly, a delay of transmission of the vehicle drive torque to the drive wheels 38 due to the delay of generation of the engine torque $T_E$ is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

The present embodiment is further arranged such that the assisting torque control means 102 performs the engine assisting operation by the second electric motor to compensate for a delay of generation of the engine torque $T_E$ by a length of time required for an increase the number of the operable cylinders of the engine 8 by the operable-cylinder-number control means 110. Accordingly, a delay of transmission of the vehicle drive torque to the drive wheels 38 due to the delay of generation of the engine torque $T_E$ is reduced to reduce the deterioration of the vehicle acceleration, so that the drive torque of the drive wheels for a given amount of operation of the accelerator pedal in a given running state of the vehicle is held constant, that is, the vehicle drive torque corresponding to the given amount of operation of the accelerator pedal does not significantly vary in spite of the restriction of the engine torque $T_E$, whereby the vehicle operator does not feel uncomfortable with the restriction of the engine torque $T_E$.

Embodiment 5

Figure 23:
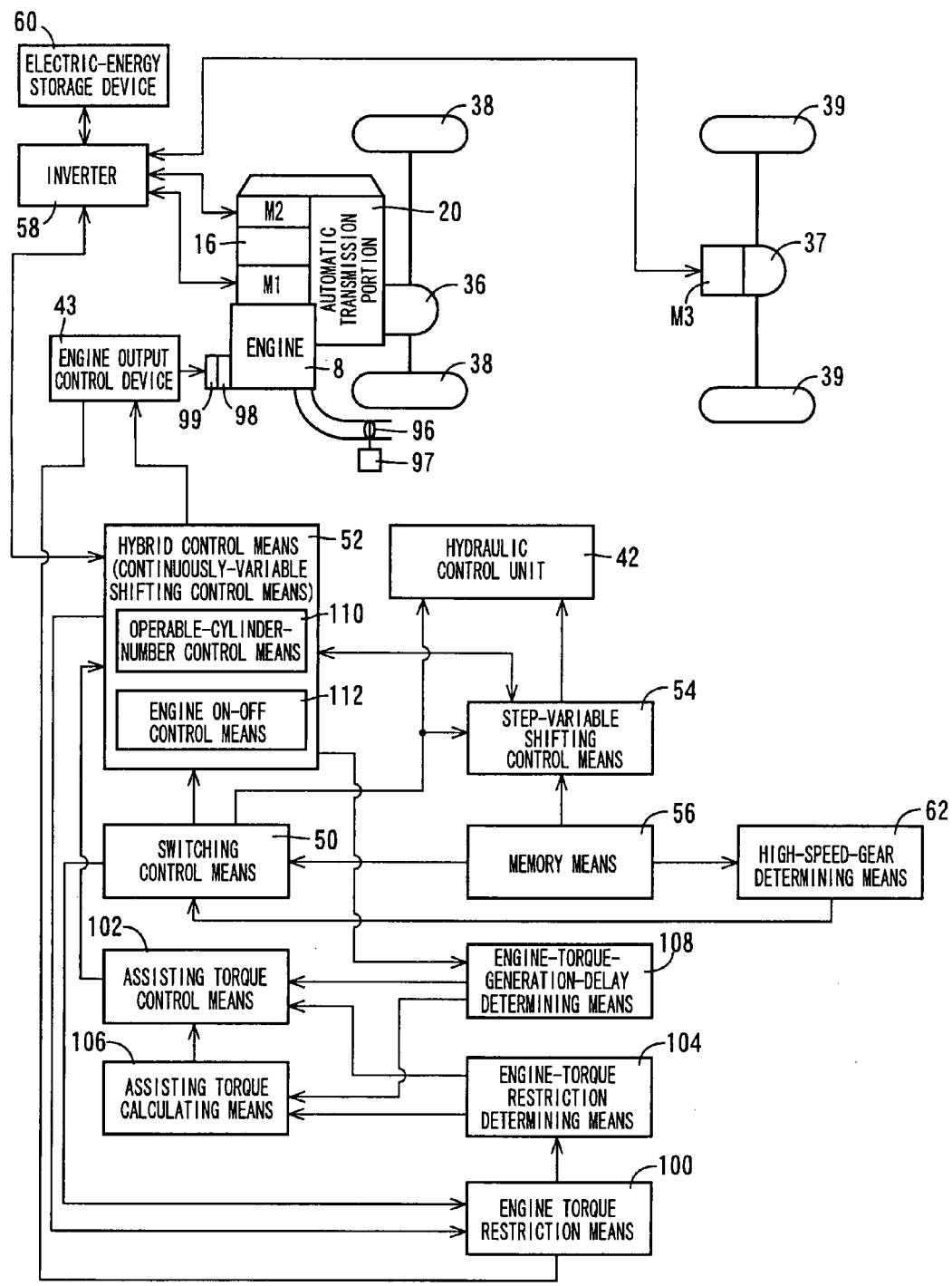
FIG. 23 is a functional block diagram corresponding to that of FIG. 17, illustrating major control functions of the electronic control device of a vehicular drive system according to a further embodiment of the invention.

Referring to the functional block diagram of FIG. 23 corresponding to that of FIG. 17, there are illustrated major control functions of the electronic control device 40 of a vehicular drive system according to a further embodiment of this invention. In the present vehicular drive system, the engine 8, first electric motor M1, differential mechanism 16 and second electric motor M2 are disposed on a first axis in the transaxle housing, and the automatic transmission 20 is disposed on a second axis parallel to the first axis, while the differential gear device (final speed reduction device) 36 is disposed on a third axis parallel to the first axis. The right and left drive wheels (front wheels (38 are driven by the differential gear device 36. The present vehicular drive system is further provided with a rear-wheel driving electric motor M3 and a differential gear device 37 for driving right and left rear wheels 39. Namely, the vehicle is a four-wheel drive vehicle. The rear-wheel driving electric motor M3 is utilized to perform an engine assisting operation.

Figure 24:
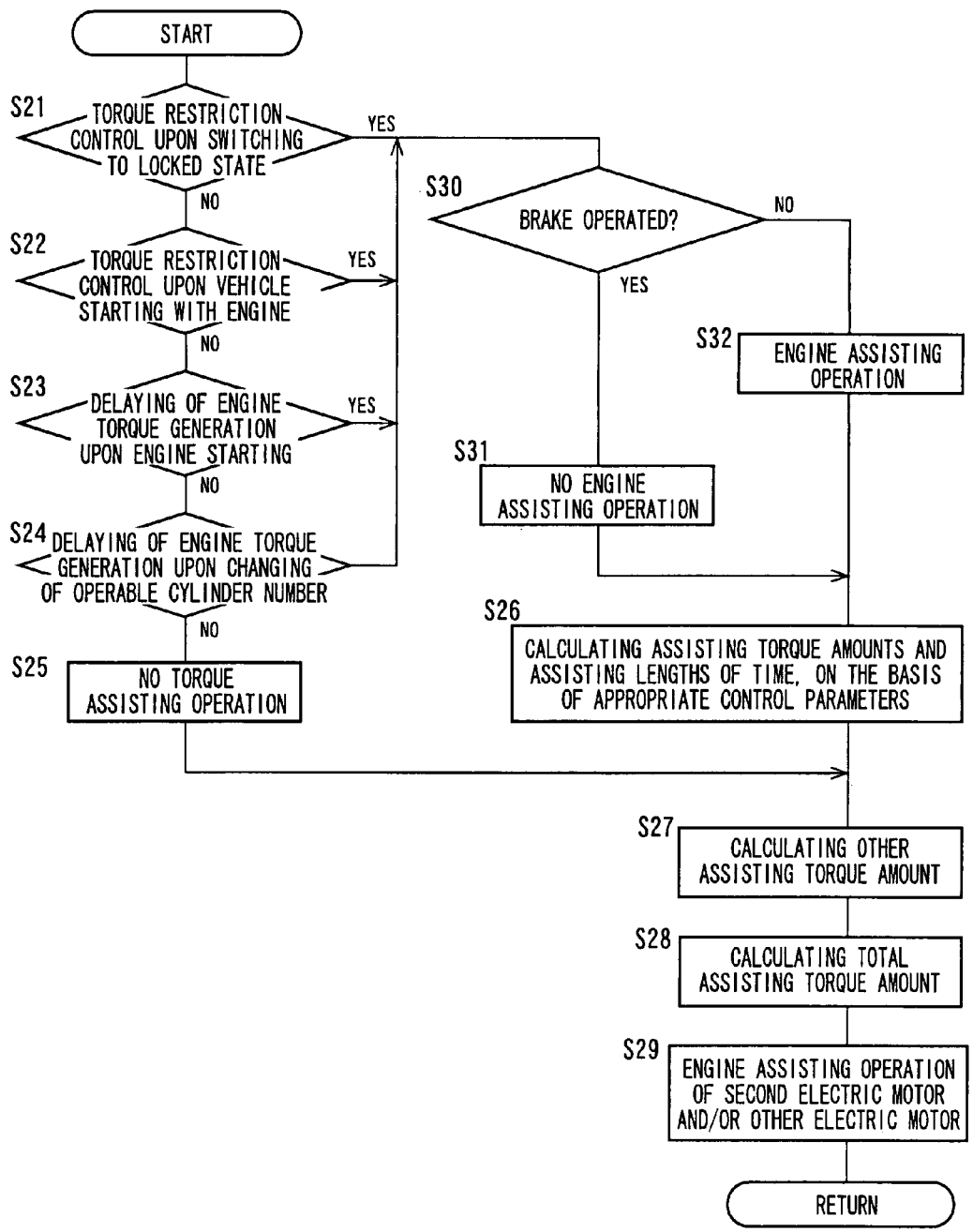
FIG. 24 is a flow chart corresponding to that of FIG. 20, illustrating a major control operation of the electronic control device in the embodiment of FIG. 23.

Referring next to the flow chart of FIG. 24 corresponding to that of FIG. 20, there is illustrated a major control operation of the electric control device 40 of the embodiment of FIG. 23. In the control routine of FIG. 24, S21-S28 are identical with S1-S18 of FIG. 20, respectively. However, S29 is provided to perform an engine assisting operation in which the total assisting torque amount $T_{ALL}$ is provided by the second electric motor M2, or by the first electric motor M1 alone or both of the first and second electric motors M1, M2 when the first electric motor M1 is available for the engine assisting operation, or by the rear-wheel driving electric motor M3 alone or both of the second and rear-wheel driving electric motors M2, M3 when the rear-wheel driving electric motor M3 is available for the engine assisting operation. When the roadway on which the vehicle is running has' a relatively low friction coefficient or a bad surface condition, the rear-wheel driving electric motor M3 is preferentially used for the engine assisting operation. Where the engine 8 is provided with a starter motor for starting the engine 8, this starter motor may be used for the engine assisting operation.

In the present embodiment, S30-S32 are provided for performing the engine assisting operation only when a brake pedal and a parking brake lever or pedal are not operated. Namely, S30 is provided to determine whether a braking system of the vehicle has been operated. If an affirmative determination is obtained in S30, this indicates that an operation to brake the vehicle is required, and the vehicle operator does not intend to start the vehicle. In this case, the control flow goes to S31 to inhibit the engine assisting operation by the electric motor, for saving the electric power. If a negative determination is obtained in S30, the control flow goes to S32 to perform the engine assisting operation, and then goes to S26 and the subsequent steps. In the present embodiment, the engine assisting operation is performed in the same manner as indicated in the time charts of FIGS. 21 and 22, when the operation to brake the vehicle is not required, without an operation of the brake pedal or the parking brake lever or pedal. Thus, the present embodiment provides the same advantages as the preceding embodiment.

While the preferred embodiments of this invention have been described in detail by reference to the accompanying drawings, it is to be understood that the present invention may be otherwise embodied.

In the illustrated embodiment, the vehicle-starting-engine-torque restricting means 86 is configured to restrict the engine torque $T_E$ so as to enable the differential portion 11 to operate as the electrically controlled continuously variable transmission under the control of the hybrid control means 52, upon starting of the vehicle with the engine 8 used as the vehicle drive power source, and when the vehicle-speed determining means 84 determines that the actual vehicle speed V is not higher than the predetermined value V2. However, the negative determination by the vehicle-speed determining means 84 need not be the condition that should be satisfied for the vehicle-starting-engine-torque restricting means 86 to restrict the engine torque $T_E$. In this case, too, the output of the first electric motor M1 which generates the reaction torque corresponding to the engine torque $T_E$ can be made smaller than in the case where the engine torque $T_E$ is not restricted. Accordingly, the required size of the first electric motor M1 can be reduced.

In the illustrated embodiment, the differential portion 11 is selectively placed in one of the continuously-variable shifting state and the fixed-speed-ratio shifting state, so that the transmission mechanism 10, 70 is switchable between the continuously-variable shifting state in which the differential portion 11 functions as the electrically controlled continuously variable transmission, and the step-variable shifting state in which the differential portion 11 functions as the step-variable transmission. However, the principle of the present invention is applicable to any transmission mechanism which is not switchable to the step-variable shifting state, that is, in which the differential mechanism 11 is not provided with the switching clutch C0 and the switching brake B0 and functions only as the electrically controlled continuously variable transmission (electrically controlled differential device).

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 and power distributing mechanism 16) which is switchable between the differential and non-differential states.

In the illustrated embodiments, the first clutch C1 and the second clutch C2 constituting a part of the automatic transmission portion 20, 72, are provided as coupling devices operable to place the power transmitting path selectively in one of the power transmitting state and the power cut-off state, and these first and second clutches C1, C2 are disposed between the automatic transmission portion 20, 72 and the differential portion 11. However, the first and second clutches C1, C2 may be replaced by at least one coupling device operable to place the power transmitting path selectively in one of the power transmitting state and the power cut-off state. For instance, each of the above-indicated at least one coupling device may be connected to the output shaft 22, or to a suitable rotary member of the automatic transmission portion 20, 72. Further, the coupling device need not constitute a part of the automatic transmission portion 20, 72, and may be provided independently of the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiments, the second electric motor M2 may be connected to a rotary member of the automatic transmission portion 20, 70.

In the illustrated embodiments, the step-variable transmission portion 20, 72 is disposed in the power transmitting path between the drive wheels 38, and the power transmitting member 18 which is the output member of the continuously-variable transmission portion 11 or power distributing mechanism 16. However, the step-variable transmission portion 20, 72 may be replaced by any other type of power transmitting device such: an automatic transmission in the form of a continuously variable transmission (CVT); an automatic transmission which is a permanent-mesh parallel-two-axes type transmission well known as a manual transmission and which is automatically shifted by select cylinders and shift cylinders; and a manual transmission of synchronous meshing type which is manually shifted. Where the step-variable transmission portion is replaced by the continuously variable transmission (CVT), the transmission mechanism as a whole is placed in the step-variable shifting state when the power distributing mechanism 16 is placed in its fixed-speed-ratio shifting state. In the step-variable shifting state, the drive force is transmitted primarily through a mechanical power transmitting path, and not through an electric path. The above-indicated continuously variable transmission may be controlled to change its speed ratio to a selected one of a plurality of fixed values which correspond to respective gear position of a step-variable transmission and which are stored in a memory, so that the speed ratio of the transmission mechanism can be changed in steps. Further, the principle of this invention is applicable to a transmission mechanism not provided with the automatic transmission portion 20, 72. Where the automatic transmission portion 20, 72 is replaced by the continuously variable transmission (CVT) or the permanent-mesh type, or where the automatic transmission 20, 72 is not provided, a coupling device may be disposed in a power transmitting path between the power transmitting member 18 and the drive wheels 38, so that the power transmitting path is switchable between the power transmitting state and the power cut-off state, by engaging and releasing actions of the coupling device.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

In the illustrated embodiments, the assisting torque control means 102 performs the engine assisting operation by using the second electric motor M2. However, the first electric motor M1 may be used in place of, or in addition to the second electric motor M2, for the engine assisting operation, where the first electric motor M1 is available for the engine assisting operation. For instance, the first electric motor M1 can be used for the engine assisting operation, in the locked state of the differential portion 11 with the switching clutch C0 held in the engaged state, since the three elements of the first planetary gear set 24 are rotated as a unit in the locked state, so that a rotary motion of the first electric motor M1 can be transmitted to the drive wheels 38.

The engine torque restricting means 100 in the illustrated embodiments may be configured to restrict the engine torque $T_E$ to prevent an increase of the engine torque $T_E$ beyond the predetermined upper limit TE1, for reducing the deterioration of durability of the first electric motor M1 while preventing an increase of the required size of the first electric motor M1, also in the event that the differential portion 11 cannot not be switched by the switching control means 50 from the continuously-variable shifting state (differential state) to the step-variable shifting state (locked state), due to a failure of a friction member of the switching clutch C0 or brake B0, a failure of a solenoid-operated valve built in the hydraulic control unit 42 for controlling the hydraulic actuator of the clutch C0 or brake B0, a functional deterioration of the hydraulic actuator or solenoid-operated valve, or a low temperature of the hydraulic working fluid which causes a low operating response of the hydraulic actuator or solenoid-operated valve. The principle of the present invention is applicable to the restriction of the engine torque $T_E$ in the above-indicated case.

The engine torque restricting means 100 in the illustrated embodiments may be arranged to restrict the engine torque $T_E$ in timed relation with the engaging action of the switching clutch C0 effected under the control of the switching control means 50, for instance, such that the restriction of the engine torque $T_E$ is initiated immediately before completion of the engaging action. The principle of the present invention is applicable to the restriction of the engine torque $T_E$ in the above-indicated manner.

While the engine on-off control means 112 is provided in the illustrated embodiments to start and stop the engine 8, engine starting means for starting the engine 8 may be provided in addition to engine stopping means for stopping the engine 8.

While the operable-cylinder-number control means 110 is provided to change the number of the operable cylinders of the engine 8. in the illustrated embodiments, this operable-cylinder-number control means 110 may be configured to change the number of the operable cylinders sequentially or at one time or in any fashion, between the no-cylinder operating mode (fuel cut mode) and the all-cylinder operating mode. Where the engine 8 has six cylinders, for example, the operable-cylinder-number control means 110 may sequentially increase or reduce the number of the operable cylinders between zero and six, or change the number between one and four or between three and six, at one time. Further, the plurality of cylinders may be classified into a plurality of groups, so that a selected one or ones or all of the groups is/are selected as the operable group or groups. Alternatively, the engine may consist of two banks of cylinders, so that the engine is operable in a so-called "bank switching control mode" in which one or both of the two banks is/are selected as the operable bank or banks. Where the number of the operable cylinders is changed at one time or the engine is operated in the bank switching control mode, the engine torque $T_E$ can be rapidly changed. The required output torque can be rapidly obtained particularly where the single-bank operation is switched to the two-bank operation or where the number of operable cylinders is changed from one to four at one time.

The operable-cylinder-number control means 110 in the illustrated embodiments is arranged to select the partial-cylinder operating mode (including the fuel cut mode) by cutting the fuel supply to the selected cylinder or cylinders. However, the partial-cylinder operating mode may be selected either by simply cutting the fuel supply to the selected cylinder or cylinders, or by restricting a change of the pressure in each cylinder subjected to the fuel cut, for reducing the dragging (resistance to rotary motion) of the engine 8. Where the engine 8 is provided with a variable-valve timing mechanism for changing the operating timings of the intake and exhaust valves in at least one of the four strokes so as to restrict the pressure change in each cylinder, for example, the operable-cylinder-number control means 110 controls the variable-valve timing mechanism to restrict the pressure change in each cylinder subjected to the fuel cut in the partial-cylinder operating mode, so that the pumping loss of the engine 8 is reduced to reduce the dragging of the engine 8. There are various other means for restricting the pressure change in the cylinder, such as means for positively opening the throttle valve in the intake stroke, to restrict the generation of the negative pressure in the cylinder for thereby restricting the pressure change, and means for cutting mechanical connection between the crankshaft and the piston of the engine 8, to stop the reciprocating motion of the piston for thereby restricting the pressure change in the cylinder.

The assisting torque control means 102 in the illustrated embodiments is arranged to perform the engine assisting operation when the differential portion 11 is automatically switched to the locked state under the control of the switching control means 50 on the basis of the vehicle state. However, the engine assisting operation may be performed also when the differential portion 11 is manually switched to the locked state upon manual operation of the switch 44.

In the illustrated embodiments, the automatic transmission portion 20 is automatically shifted under the control of the step-variable shifting control means 54 on the basis of the vehicle state. However, the speed ratio of the automatic transmission portion 20 may be manually changed in a so-called "manual shifting mode (M mode)".

In the example of FIG. 21, the input torque of the automatic transmission portion 20 may be reduced by controlling the first electric motor M1 to provide a reverse drive torque or a regenerative braking torque in timed relation with the moment of completion of a shifting action of the automatic transmission portion 20 initiated by the step-variable shifting control means 54 at the point of time t4. This control of the first electric motor M1 assures more effective reduction of the shifting shock of the automatic transmission portion 20, than retardation of the ignition timing or throttle valve opening control of the engine.

The engine 8 provided in the illustrated embodiments may be provided with solenoid-operated valves or actuators for opening and closing the intake and/or exhaust valves. In this case, the non-operated cylinders can be placed in the decompression state.

In the illustrated embodiments, the differential mechanism 16 of the vehicle is provided with the first electric motor M1 and the second electric motor M2. However, both of these two first and second electric motors M1, M2 need not be provided, since the restriction of the engine torque according to the present invention may be effected on the basis of the upper limit of the mechanical torque capacity of the differential mechanism 16 as well as the electric torque capacity of the differential mechanism 16.

The illustrated embodiments may use the same control apparatus for some of the control features described above.

It is to be understood that the embodiments of the invention have been descried for illustrative purpose only, and that the present invention may be embodied with various changes and modifications which may occur to those skilled in the art.

The invention claimed is:

1. A vehicular drive system, comprising:
a continuously-variable transmission portion operable as an electrically controlled continuously variable transmission and having a differential mechanism operable to distribute an output of an engine to a first electric motor and a power transmitting member; a second electric motor disposed in a power transmitting path between said power transmitting member and a drive wheel of a vehicle;
an automatic transmission portion, which constitutes a part of said power transmitting path, and which functions as an automatic transmission; and
a control apparatus including vehicle-starting-engine-torque restricting means for restricting an output torque of said engine upon starting of the vehicle with said engine used as a vehicle drive power source.

2. The vehicular drive system according to claim 1, wherein said vehicle-starting-engine-torque restricting means restricts the output torque of said engine when a running speed of the vehicle is not higher than a predetermined value.

3. The vehicular drive system according to claim 1, wherein said vehicle-starting-engine-torque restricting means restricts the output torque of said engine, so as to prevent an increase of the output torque beyond a maximum reaction torque that can be generated by said first electric motor.

4. The vehicular drive system according to claim 1, wherein said differential mechanism is provided with a differential-state switching device which is released to place said continuously-variable transmission portion in a continuously-variable shifting state in which the continuously-variable transmission portion is operable as the electrically controlled continuously variable transmission, and engaged to place said continuously-variable transmission portion in a step-variable shifting state in which the continuously-variable transmission portion is not operable as the electrically controlled continuously variable transmission.

5. The vehicular drive system according to claim 1, wherein said vehicle-starting-engine-torque restricting means does not restrict the output torque of the engine when a running speed of the vehicle is higher than a predetermined value.

6. The vehicular drive system according to claim 5, wherein said continuously-variable transmission portion is switched by a differential-mechanism switching device to a step-variable shifting state in which the continuously-variable transmission portion does not perform an electrically controlled continuously-variable shifting operation.

7. A vehicular drive system, comprising:
- a differential portion having a differential mechanism operable to distribute an output of an engine to a first electric motor and a power transmitting member;
- a second electric motor disposed in a power transmitting path between said power transmitting member and a drive wheel of a vehicle;
- a transmission portion, which constitutes a part of said power transmitting path and which functions as a transmission; and
- a control apparatus including vehicle-starting-engine-torque restricting means for restricting an output torque of said engine upon starting of the vehicle with said engine used as a vehicle drive power source.

8. The vehicular drive system according to claim 7, wherein said vehicle-starting-engine-torque restricting means restricts the output torque of said engine when a running speed of the vehicle is not higher than a predetermined value.

9. The vehicular drive system according to claim 7, wherein said vehicle-starting-engine-torque restricting means restricts the output torque of said engine, so as to prevent an increase of the output torque beyond a maximum reaction torque that can be generated by said first electric motor.

10. The vehicular drive system according to claim 7, wherein said differential mechanism is provided with a differential-state switching device operable to selectively place said differential mechanism in one of a differential state in which the differential mechanism performs a differential function and functions as a transmission the speed ratio of which is electrically variable owing to the differential function, and a non-differential state for mechanically transmitting a drive force in a locked state thereof in which the differential mechanism does not perform said differential function.

11. The vehicular drive system according to claim 7, wherein said vehicle-starting-engine-torque restricting means does not restrict the output torque of the engine when a running speed of the vehicle is higher than a predetermined value.

12. The vehicular drive system according to claim 11, wherein said differential portion is switched by a differential-mechanism switching device to a step-variable shifting state in which the differential portion does not perform an electrically controlled continuously-variable shifting operation.

* * * * *